(12) United States Patent
Yoshida et al.

(10) Patent No.: US 10,506,151 B2
(45) Date of Patent: Dec. 10, 2019

(54) INFORMATION ACQUISITION APPARATUS

(71) Applicant: Olympus Corporation, Hachioji-shi, Tokyo (JP)

(72) Inventors: Hideaki Yoshida, Tokyo (JP); Hisayuki Harada, Tokyo (JP); Toshikazu Hayashi, Tokyo (JP); Keiji Okada, Tokyo (JP); Yuichi Tsuchimochi, Tokyo (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 82 days.

(21) Appl. No.: 15/873,800

(22) Filed: Jan. 17, 2018

(65) Prior Publication Data

US 2018/0213148 A1 Jul. 26, 2018

(30) Foreign Application Priority Data

Jan. 20, 2017 (JP) ................ 2017-008943

(51) Int. Cl.
*H04N 5/232* (2006.01)
*H04N 1/21* (2006.01)
*G01B 11/02* (2006.01)

(52) U.S. Cl.
CPC ....... *H04N 5/23222* (2013.01); *G01B 11/022* (2013.01); *H04N 1/2125* (2013.01); *H04N 5/23218* (2018.08); *H04N 5/232935* (2018.08)

(58) Field of Classification Search
CPC ............. H04N 1/2125; H04N 5/23218; H04N 5/23222; H04N 5/23229; H04N 5/232935; G01B 11/022
See application file for complete search history.

(56) References Cited

U.S. PATENT DOCUMENTS

| | | | | |
|---|---|---|---|---|
| 8,502,887 B2 * | 8/2013 | Yamamoto | ............... | G06T 11/60 348/231.3 |
| 8,629,922 B2 * | 1/2014 | Iwasaki | ............... | H04N 5/23293 348/231.1 |
| 8,675,112 B2 * | 3/2014 | Arujunan | ........... | H04N 1/00137 348/333.01 |
| 10,289,990 B2 * | 5/2019 | Rizzolo | ............ | G06K 19/06028 |
| 2001/0048802 A1 * | 12/2001 | Nakajima | ............... | G06T 11/60 386/228 |

(Continued)

FOREIGN PATENT DOCUMENTS

JP 2001-024982 1/2001

*Primary Examiner* — Daniel M Pasiewicz
(74) *Attorney, Agent, or Firm* — John C. Pokotylo; Pokotylo Patent Services

(57) ABSTRACT

An information acquisition apparatus includes: a configuration information acquisition section that acquires configuration information that indicates a configuration of a plurality of portions to be photographed; a determination section that determines a photographing state of a portion indicated in the configuration information; and a photographing guide screen creation section that creates the photographing guide screen, wherein the photographing guide screen creation section includes the acquired configuration information in the photographing guide screen, and adds, to the portion indicated in the configuration information, state information that indicates a photographing state based on the determination performed by the determination section.

8 Claims, 25 Drawing Sheets

(56) References Cited

U.S. PATENT DOCUMENTS

| | | | |
|---|---|---|---|
| 2005/0168779 A1* | 8/2005 | Tsue | H04N 1/3875 358/1.18 |
| 2008/0306787 A1* | 12/2008 | Hamilton | G06Q 10/06 705/7.38 |
| 2009/0102940 A1* | 4/2009 | Uchida | G06K 9/00664 348/222.1 |
| 2010/0171826 A1* | 7/2010 | Hamilton | G06Q 30/06 348/135 |
| 2011/0050909 A1* | 3/2011 | Ellenby | G03B 17/24 348/207.1 |
| 2015/0025915 A1* | 1/2015 | Lekas | G06Q 40/08 705/4 |
| 2018/0225839 A1* | 8/2018 | Yoshida | G06K 9/00201 |

\* cited by examiner

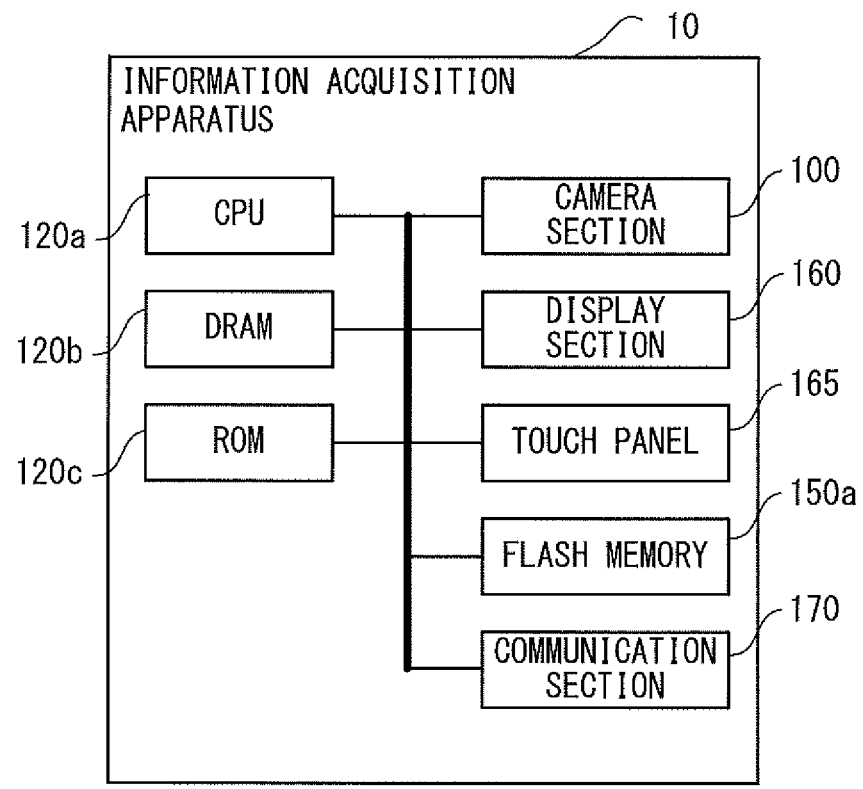
F I G. 3

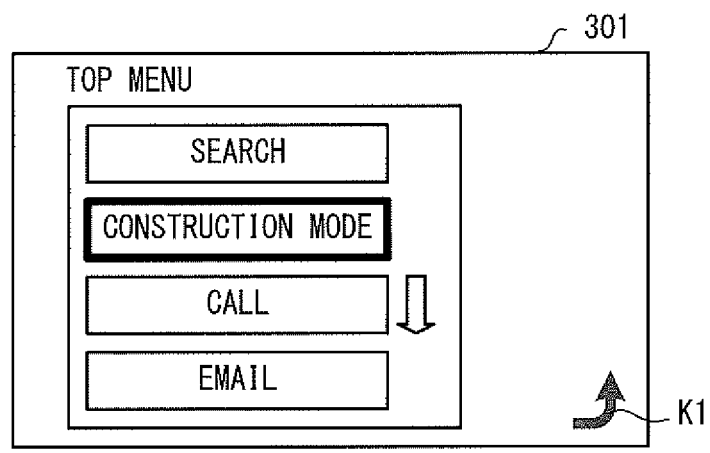
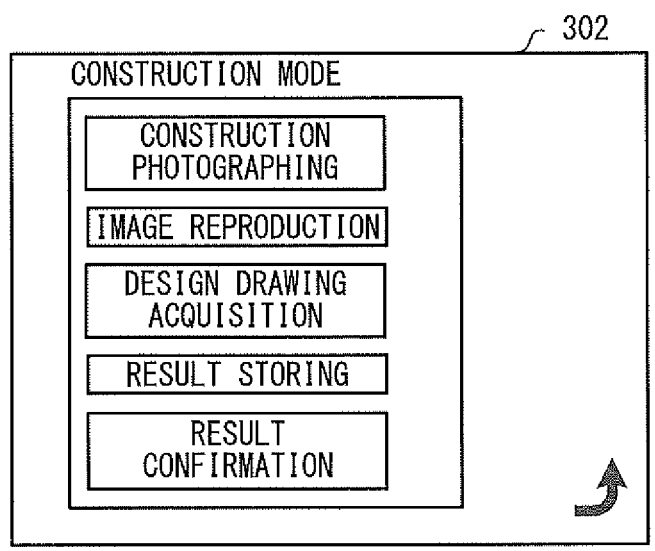
F I G. 5

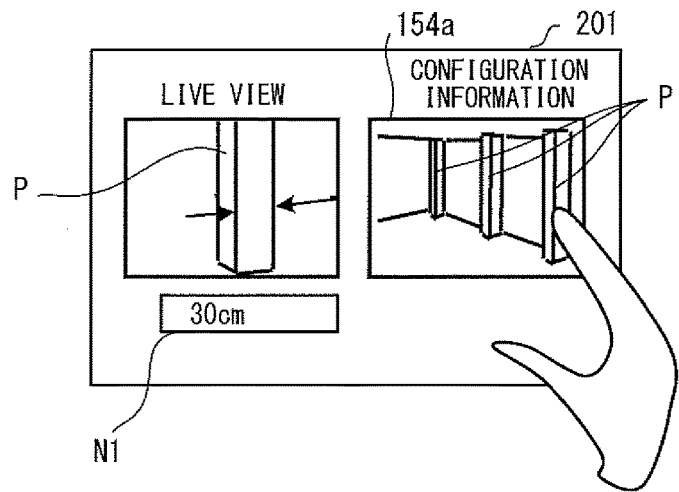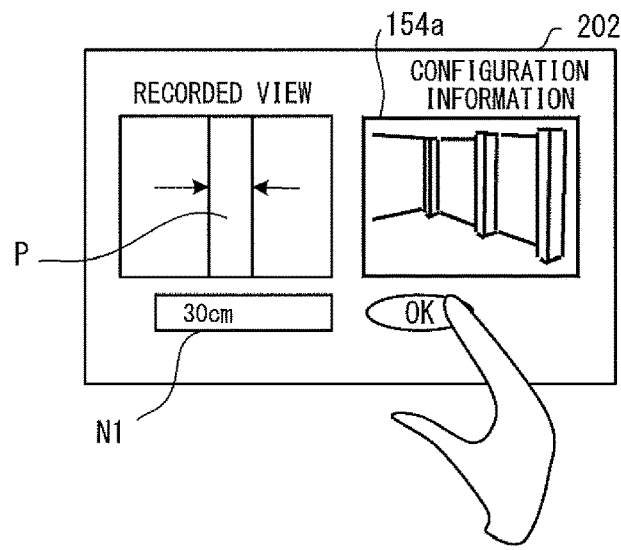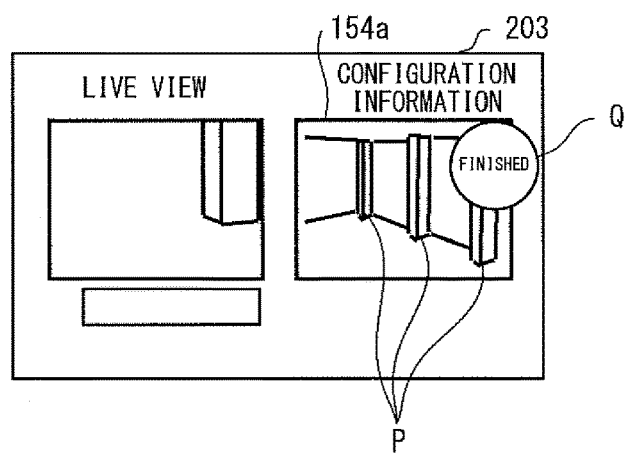
F I G. 6

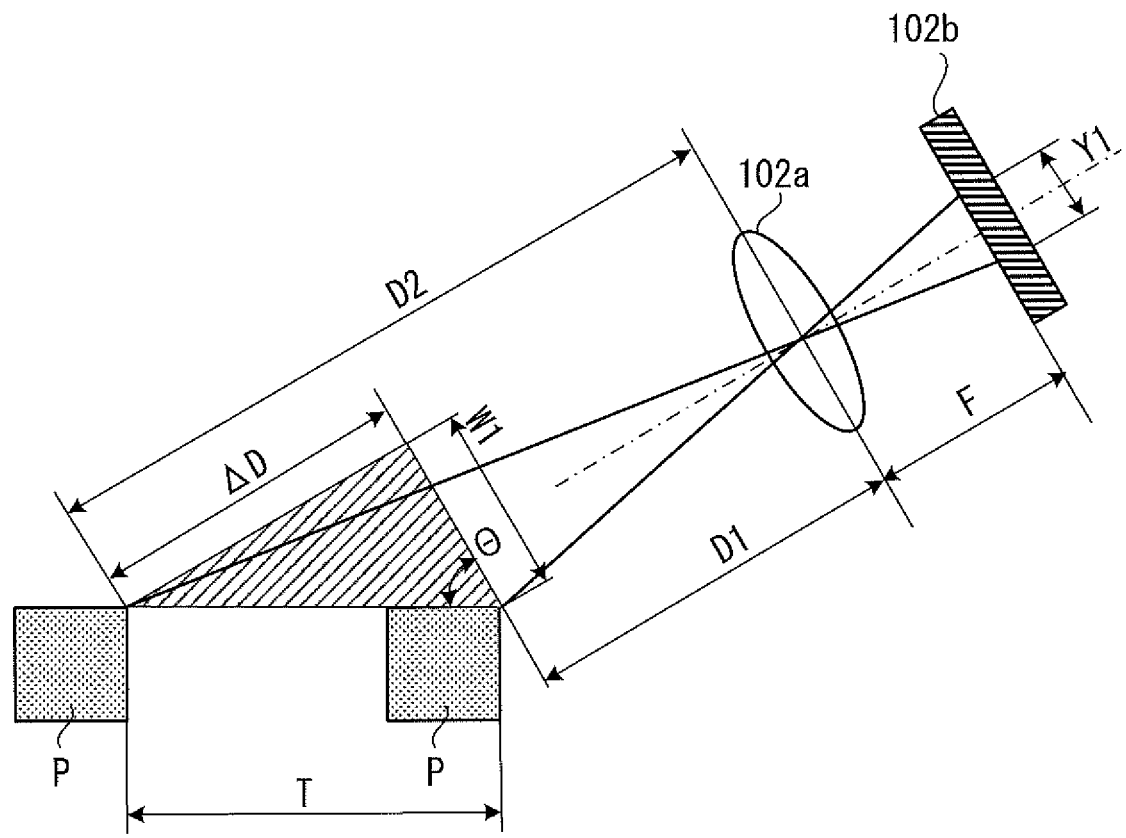
F I G. 14C

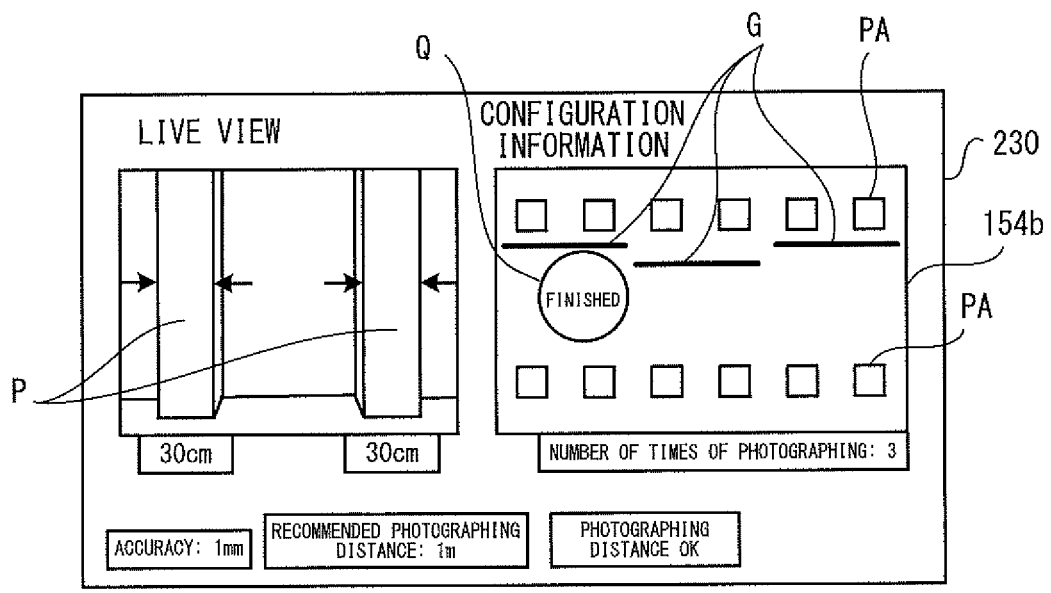
F I G. 15 A

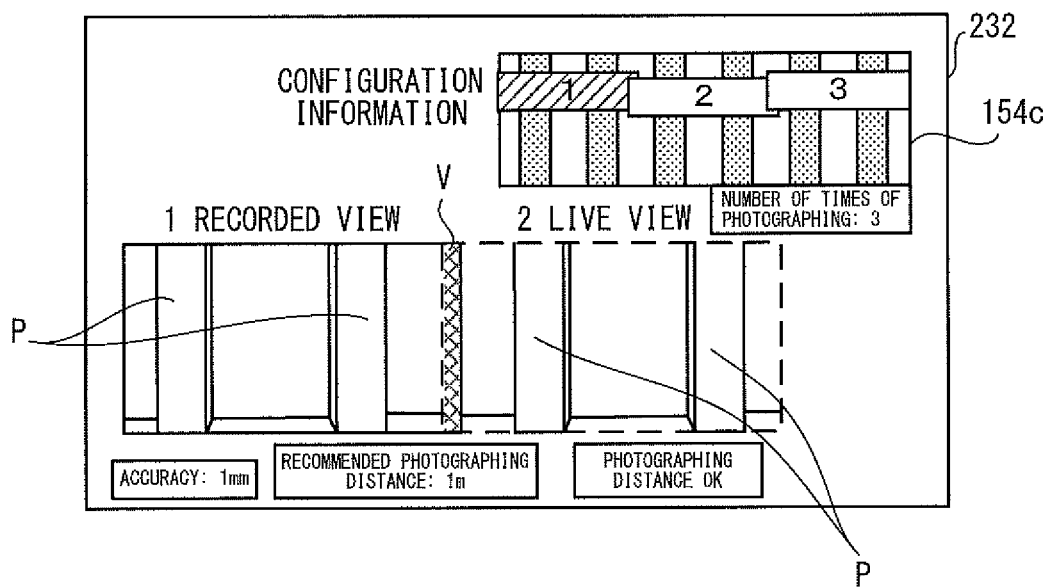
F I G. 1 5 C

INFORMATION ACQUISITION APPARATUS

CROSS-REFERENCE TO RELATED APPLICATIONS

This application is based upon and claims the benefit of priority of the prior Japanese Patent Application No. 2017-008943, filed on Jan. 20, 2017, the entire contents of which are incorporated herein by reference.

BACKGROUND OF THE INVENTION

Field of the Invention

The present invention relates to an information acquisition apparatus that captures, for example, a construction-related image.

Description of the Related Art

Since images captured by digital cameras are overwhelmingly superior to film photographs in terms of timeliness, they have been increasingly used for evidence photos in various business fields. For example, image data acquired using a digital camera is used for evidence photos at construction sites and sites of civil engineering works. At a construction site, a construction place such as a pillar or a wall, or foundation work is photographed and construction-related images are managed. A construction state at one construction site is photographed hundreds or thousands of times. Various technologies for improving an operation in a construction photographing system that uses a digital camera have been proposed (for example, Patent Document 1).

Patent Document 1: Laid-open Patent Publication No. 2001-24982

SUMMARY OF THE INVENTION

An information acquisition apparatus according to embodiments of the present invention that displays a photographing guide screen when photographing is performed includes: a configuration information acquisition section that acquires configuration information that indicates a configuration of a plurality of portions to be photographed; a determination section that determines a photographing state of a portion indicated in the configuration information; and a photographing guide screen creation section that creates the photographing guide screen, wherein the photographing guide screen creation section includes the acquired configuration information in the photographing guide screen, and adds, to the portion indicated in the configuration information, state information that indicates a photographing state based on the determination performed by the determination section.

BRIEF DESCRIPTION OF THE DRAWINGS

FIG. 3 is a hardware block diagram of an information acquisition apparatus;

FIG. 5 illustrates examples of setting screens each used to set a processing mode of the information acquisition apparatus;

FIG. 6 illustrates examples of guide screens each constituted of first configuration information;

FIG. 14C illustrates a principle of measuring a space between foundations of a floor using a captured image;

FIG. 15A illustrates an example of a guide screen on which the second configuration information has been displayed according to the second embodiment;

FIG. 15C illustrates an example of a guide screen on which a panoramic image has been displayed according to the second embodiment.

DETAILED DESCRIPTION OF THE PREFERRED EMBODIMENTS

Figure 1A:
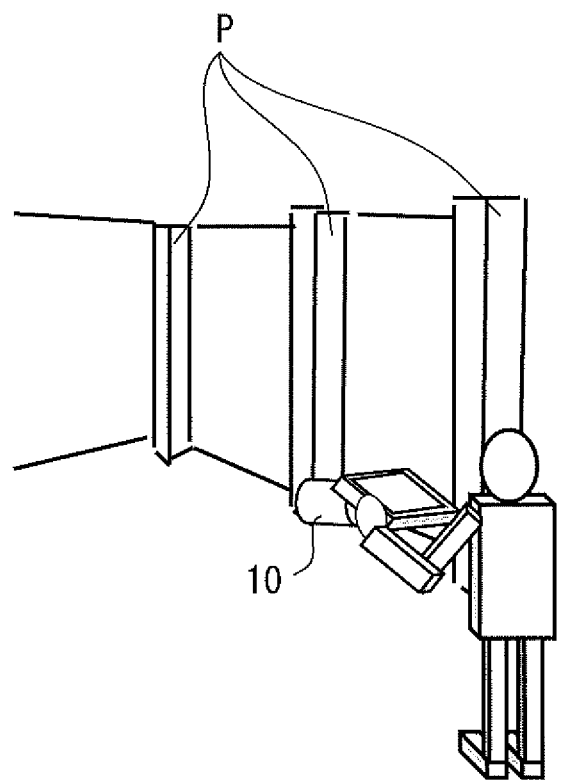
FIG. 1A illustrates an example of a photographing state at a construction site.
Figure 1B:
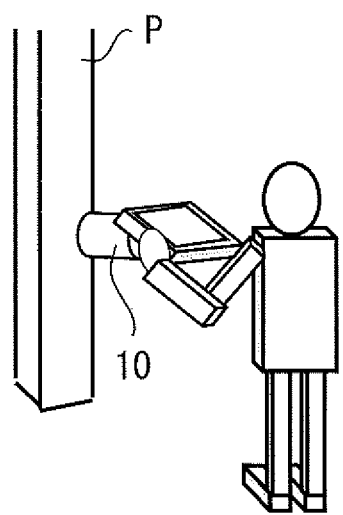
FIG. 1B illustrates an example of a photographing state at a construction site.

Embodiments of the present invention are described below with reference to the drawings. An example in which an information acquisition system 1 is used to perform construction photographing is described. The purpose of construction photographing is to acquire an evidence photo of a concrete construction state at a construction site. FIGS. 1A and 1B illustrate specific examples of construction photographing. FIG. 1A is a diagram in which a photographer who has a photographing device (hereinafter referred to as an information acquisition apparatus 10) is preparing to perform photographing in a room in which a plurality of pillars P have been constructed. FIG. 1B is a diagram in which the photographer is aiming the information acquisition apparatus 10 at one of the pillars P that are a construction place to photograph the pillar P. The construction place to be photographed such as the pillar P is hereinafter also referred to as a portion or a photographing target portion.

Figure 2:
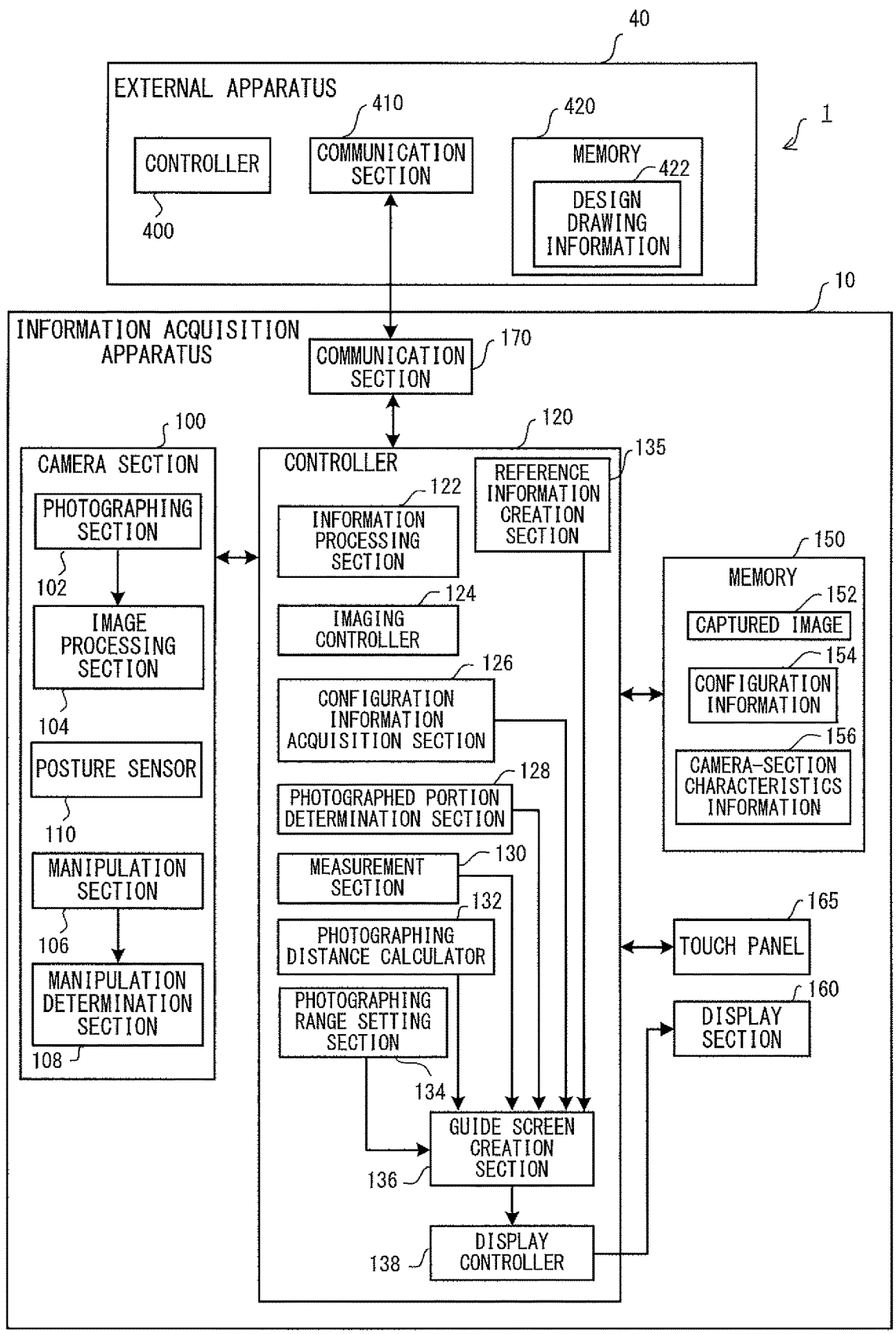
FIG. 2 illustrates a configuration of an entire information acquisition system.

FIG. 2 illustrates a configuration of the entire information acquisition system 1. Roughly speaking, the information acquisition system 1 is constituted of the information acquisition apparatus 10 and an external apparatus 40. The information acquisition apparatus 10 is an apparatus that acquires a captured image. The information acquisition apparatus 10 may be a digital camera, an information processing device with a camera, or a system that is a combination of a camera and an information processing terminal (such as a tablet information processing terminal). The external apparatus 40 is, for example, a server that is connected to the information acquisition apparatus 10 through a communication line and stores therein a result of photographing performed by the information acquisition apparatus 10.

The information acquisition apparatus 10 includes, for example, a camera section 100, a controller 120, a memory 150, a display section 160, a touch panel 165, and a communication section 170. The camera section 100 is also simply referred to as a camera.

The camera section 100 includes a photographing section 102, an image processing section 104, a manipulation section 106, a manipulation determination section 108, and a posture sensor 110. The photographing section 102 includes, for example, a lens 102a (not illustrated) and an imaging element 102b (not illustrated) and converts a subject image into an image signal. The image processing section 104 converts an image signal output from the photographing section 102 into digital data so as to perform various image processing.

The manipulation section 106 is an instruction member that adjusts a focal position and a focal length of the lens 102a included in the photographing section 102. The manipulation determination section 108 determines a manipulation performed on the manipulation section 106. The posture sensor 110 is a sensor that detects a posture and an orientation of the camera section 100. The posture sensor 110 includes, for example, a tilt sensor (an accelerometer) or an electronic compass.

The controller 120 performs an overall control of the entire information acquisition apparatus 10. The controller 120 includes, for example, an information processing section 122, an imaging controller 124, a configuration information acquisition section 126, a photographed portion determination section 128, a measurement section 130, a photographing distance calculator 132, a photographing range setting section 134, a reference information creation section 135, a guide screen creation section 136, and a display controller 138.

The information processing section 122 performs various determination processing and processes information input from the external apparatus 40 and the camera section 100. The imaging controller 124 controls the camera section 100 according to an instruction input through the touch panel 165, so as to switch the operation mode of the camera section 100 and perform photographing.

The configuration information acquisition section 126 acquires configuration information from design drawing information 422 of the external apparatus 40 or from an image captured by the camera section 100. The configuration information is information that indicates a configuration of a plurality of portions to be photographed. The portion to be photographed is a construction place such as a pillar, a wall, and a girder. Hereinafter, primarily two types of configuration information, first configuration information and second configuration information, are described. The first configuration information is information that indicates a configuration of a plurality of portions on the basis of the captured image. The second configuration information is information that indicates the configuration of the plurality of portions on the basis of the design drawing.

The configuration information acquisition section 126 acquires, as the first configuration information, an image of the entirety of a plurality of portions that is captured by the camera section 100. Further, the configuration information acquisition section 126 acquires the second configuration information from the design drawing information 422 of the external apparatus 40. The configuration information will be described in detail later.

The photographed portion determination section 128 determines a photographed portion in the process of sequentially photographing a plurality of portions. At a construction site, there are a large number of portions having sizes similar to one another. Thus, it is possible to avoid performing unnecessary redundant photographing and to avoid forgetting to perform photographing by determining a photographed portion in the process of sequential photographing.

The measurement section 130 measures a portion size from a captured image and outputs a measurement value. When the portion is a pillar, the portion size is, for example, the width (the diameter) or the height of the pillar. When the portion is a girder, the portion size is, for example, the thickness of the girder.

The photographing distance calculator 132 calculates a distance between the camera section 100 and a portion (a subject) to be photographed. The photographing distance calculator 132 may calculate a photographing distance using, for example, the position of a focusing lens of the photographing section 102. Further, when the photographing section 102 is a twin-lens type, the photographing distance calculator 132 may calculate a photographing distance using a phase difference between the right and left imaging elements 102b.

The photographing range setting section 134 sets a photographing range according to a requested accuracy with respect to a measurement value for a portion size. The longer the photographing distance, the wider the photographing range becomes. This results in being able to photograph a plurality of portions together at the same time, but in a decrease in measurement accuracy due to, for example, a resolving power of the imaging element 102b. Thus, when a portion size is measured with a high degree of accuracy, there is a need to perform photographing closely to the portion.

The photographing range setting section 134 calculates a photographing distance for satisfying a requested measurement accuracy on the basis of the characteristics of the camera section 100. Examples of the characteristics of the camera section 100 are an MTF and a distortion of the lens 102a, and a resolving power of the imaging element 102b. The photographing range setting section 134 sets a corresponding photographing range on the basis of the calculated photographing distance and the characteristics of the camera section 100 (a field angle of the lens 102a). The field angle of the lens 102a is determined by, for example, an F-number, a focal length, or a focal position.

Referring to an image that has been captured in advance and a general standard reference photographing procedure (recorded in an external database (DB) or in the memory 150), the reference information creation section 135 creates reference information used as a reference when construction photographing is performed. For example, the reference information creation section 135 provides, as a "standard photographing guide", a photographing procedure generally used at a construction site. Further, the reference information creation section 135 may provide, as a "similar photographing guide", a photographing procedure that has been used to photograph another floor in the same building.

The guide screen creation section 136 creates a guide screen. The guide screen is a screen on which state information that indicates a photographing state based on the determination performed by the photographed portion determination section 128 has been added to a portion indicated by configuration information. The photographing state is, for example, a status or a progress of photographing. Further, the guide screen also includes acquired configuration information. The guide screen is displayed as needed in the process of photographing.

Further, the guide screen creation section 136 includes, in the guide screen, a captured image (a live view image or a recorded-view image) of a portion and photographing condition information in addition to the configuration information to which the state information has been added. The photographing condition information is, for example, a measured portion size (dimension), a photographing distance, a requested accuracy with respect to the portion size, and a recommended photographing distance that ensures the requested accuracy. The guide screen is also referred to as a photographing guide screen, and the guide screen creation section is also referred to as a photographing guide screen creation section.

Furthermore, the guide screen creation section 136 creates a guide screen in which a photographing range set by the photographing range setting section 134 has been added to configuration information. The set photographing range is indicated as a photographing range guide on a screen presenting configuration information. The photographing range guide will be described in detail in a second embodiment.

On the basis of using information on the performance and the functionality of the camera section 100, the guide screen reports, to a photographer, information that makes it possible to perform photographing efficiently, accurately, and appropriately according to the environment upon performing photographing or measurement or according to a photographing target or a measurement target. The guide screen creation section 136 may, for example, display and report reference information created by the reference information creation section 135 in addition to the information reported to the photographer, the measurement accuracy, the measurement target, and the measurement environment. This results in displaying a guide screen that makes it possible to measure many portions properly and efficiently at the same time. The guide screen creation section 136 creates a guide screen on the basis of the performance of the camera section 100 and the accuracy of a measurement performed by the measurement section 130, or on the basis of the actual arrangement and the actual size of each portion. However, the guide screen creation section 136 may create a guide screen as needed while taking into consideration a position or a space at which a photographer can perform photographing.

The display controller 138 displays, for example, a captured image, or a setting screen for setting, for example, a mode or a guide screen on the display section 160.

The memory 150 is a nonvolatile memory. The memory 150, a nonvolatile memory, stores therein, for example, a captured image 152, configuration information 154, and camera-section characteristics information 156. The captured image 152 is image data captured and recorded by the camera section 100. The configuration information 154 is information acquired by the configuration information acquisition section 126. The configuration information 154 may be the first configuration information or the second configuration information or both the first configuration information and the second configuration information.

The camera-section characteristics information 156 is characteristics information on the camera section 100, particularly on the lens 102*a* and the imaging element 102*b*. Examples of the characteristics information on the lens 102*a* are a brightness, a resolution, and a distortion in addition to lens specifications. Examples of the characteristics information on the imaging element 102*b* are a pixel size, the number of pixels, and a pixel pitch.

The display section 160 displays, for example, a captured image or a guide screen, using, for example, an LED. The touch panel 165 is a manipulation device integral with the display section 160, and various instructions from a photographer are input to the touch panel 165. The communication section 170 is an interface that communicates various information with the external apparatus 40. The communication section 170 communicates with the external apparatus 40 through a network (not illustrated). The communication section 170 may determine a connection destination according to, for example, a received content or a connection setting. Further, the controller 120 may determine, according to the connection destination, various requested measurement specifications. Further, the external apparatus 40 may transmit the requested measurement specifications to the information acquisition apparatus 10.

The external apparatus 40 includes a controller 400, a communication section 410, and a memory 420. The external apparatus 40 is a server that manages construction photographing. The controller 400 performs an overall control of the external apparatus 40. The communication section 410 is an interface that communicates information with an externally situated apparatus such as the information acquisition apparatus 10. The memory 420 includes the design drawing information 422. A result of photographing (such as an image of a photographing target portion and a report described later) performed by the information acquisition apparatus 10 is saved in the memory 420.

FIG. 3 is a hardware block diagram of the information acquisition apparatus 10. The information acquisition apparatus 10 includes a central processing unit (CPU) 120*a*, a dynamic random access memory (DRAM) 120*b*, a read only memory (ROM) 120*c*, a flash memory 150*a*, the display section 160, the touch panel 165, and the communication section 170.

The CPU 120*a* reads and executes a control program stored in the ROM 120*c*, and controls the information acquisition apparatus 10 by software processing. The DRAM 120*b* provides a working area used to temporally store the control program or various data. The ROM 120*c* nonvolatilely stores therein the control program. The controller 120 is constituted of the CPU 120*a*, the DRAM 120*b*, and the ROM 120*c*.

The flash memory 150*a* stores therein various data tables and a captured image. The memory 150 is constituted of the flash memory 150a. The display section 160, the touch panel 165, and the communication section 170 have already been described, so their descriptions are omitted.

First Embodiment

Processing according to a first embodiment includes displaying configuration information on a guide screen; and adding, according to the progress of photographing, state information to a corresponding portion indicated by the configuration information, the state information indicating whether each portion indicated by the configuration information displayed on the guide screen has been photographed.

Figure 4A:
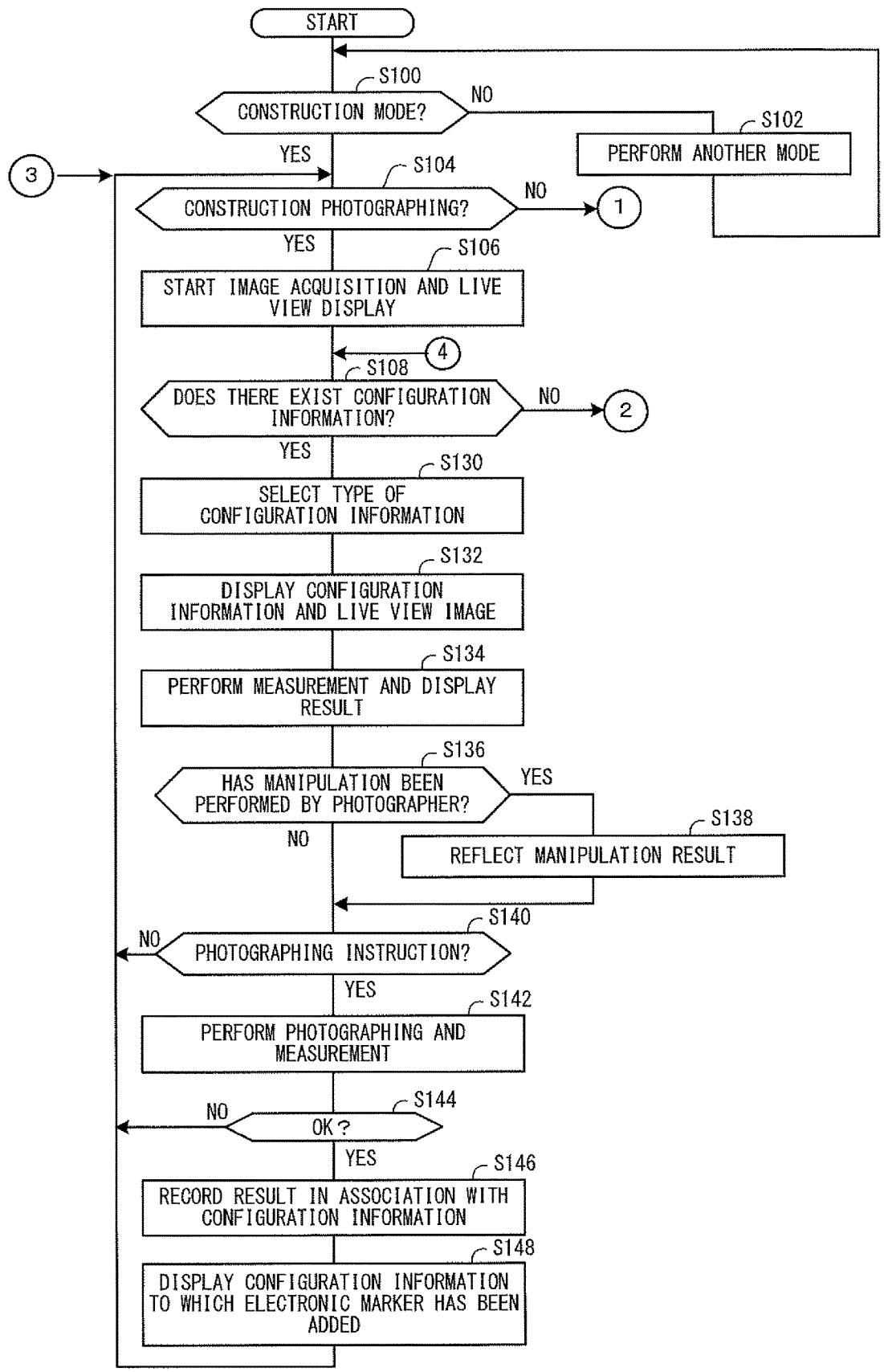
FIG. 4A is part 1 of a flowchart that illustrates guide screen display processing.
Figure 4B:
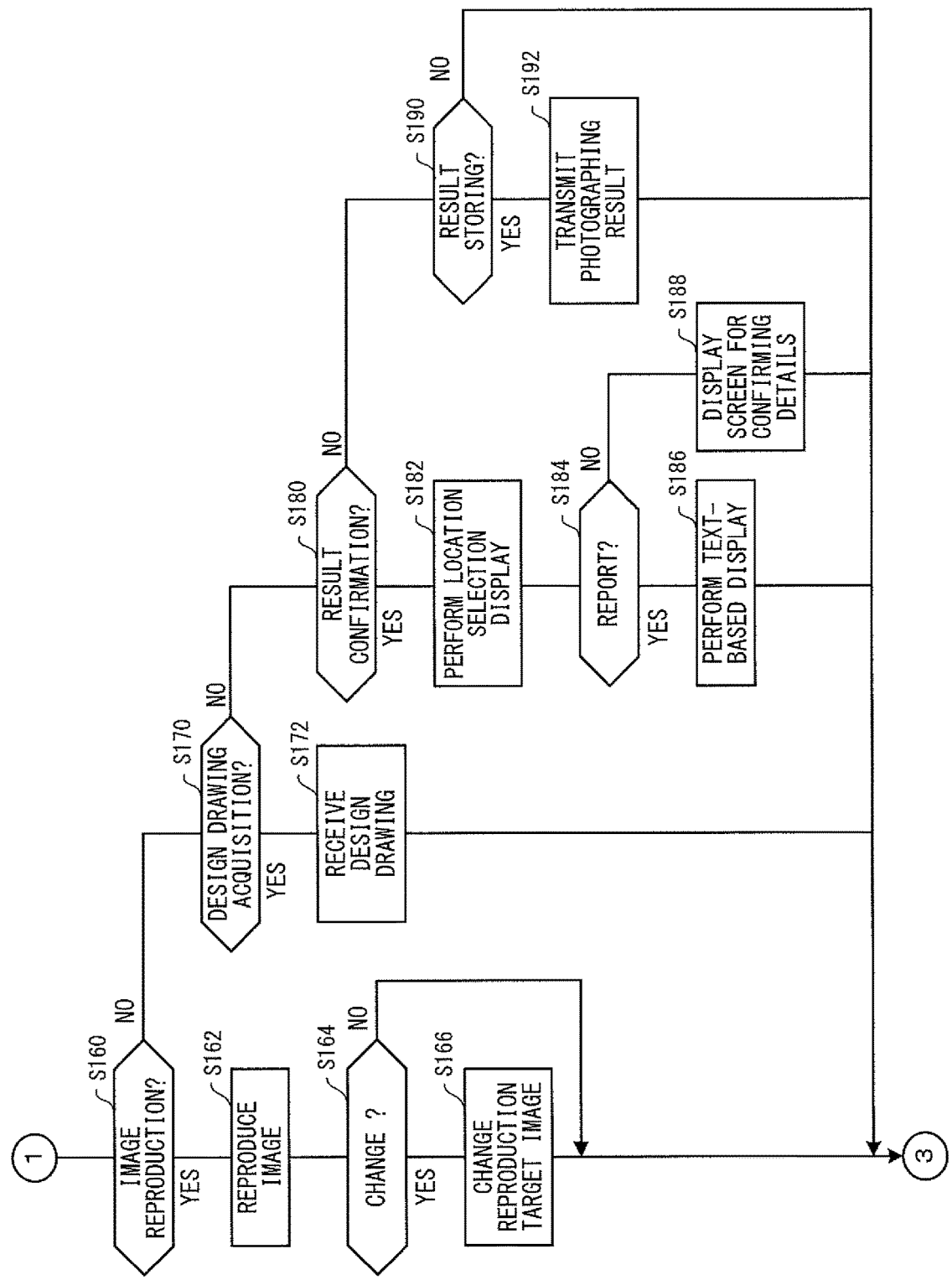
FIG. 4B is part 2 of the flowchart that illustrates the guide screen display processing.
Figure 4C:
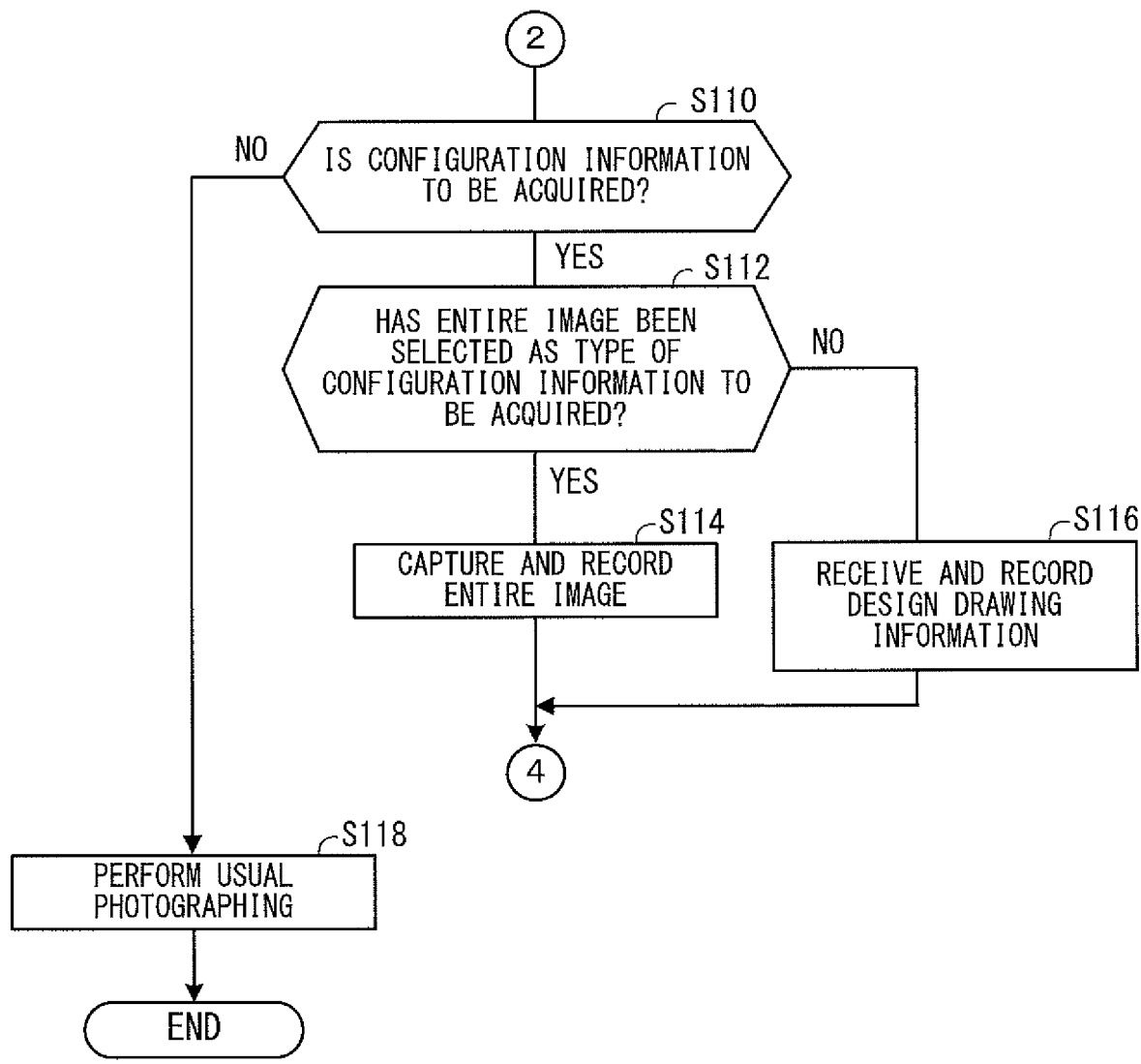
FIG. 4C is part 3 of the flowchart that illustrates the guide screen display processing.

FIGS. 4A to 4C are part 1 to part 3 of a flowchart that illustrates guide screen display processing according to the first embodiment. The guide screen display processing is largely performed by the controller 120 of the information acquisition apparatus 10.

First, the controller 120 determines whether a construction mode has been selected in the information acquisition apparatus 10 (Step S100). FIG. 5 illustrates setting screens that are displayed on the display section 160 and used to set a processing mode of the information acquisition apparatus 10.

A setting screen 301 of FIG. 5 is a mode setting screen in which a construction mode in the second position from the top has been selected. K1 is a return button. A setting screen 302 of FIG. 5 is a screen on which specific processes included in the construction mode are displayed after the construction mode has been selected. The construction mode includes sub-modes such as "construction photographing", "image reproduction", "design drawing acquisition", "result storing", and "result confirmation".

The construction photographing mode is a mode of processing of photographing each portion to be photographed. The image reproduction mode is a mode of processing of reproducing a captured image.

The design drawing acquisition mode is a mode of processing of acquiring the design drawing information 422 from the memory 420 of the external apparatus 40 as the second configuration information among the configuration information 154. The result confirmation mode is a mode of processing of a photographer or an administrator confirming a photographing content on the basis of an image of each portion that is captured in the information acquisition apparatus 10. While viewing a confirmation screen described later, the photographer or the administrator confirms that there is no portion that has not yet been photographed or there is no failure in a photographed portion. The result storing mode is a mode of processing that includes transmitting a result of photographing (a captured image and portion size information) performed in the information acquisition apparatus 10 to the external apparatus 40; and storing the photographing result in the external apparatus 40.

When the controller 120 has determined that the construction mode has not been selected in the information acquisition apparatus 10 (NO in Step S100), the controller 120 performs another mode that has been selected in the information acquisition apparatus 10 (Step S102).

When the controller 120 has determined that the construction mode has been selected in the information acquisition apparatus 10 (YES in Step S100), the controller 120 determines whether the construction photographing mode has been selected on the screen 302 for setting a construction mode in FIG. 5 (Step S104).

When the controller 120 has determined that the construction photographing mode has been selected (YES in Step S104), the controller 120 starts acquiring an image using the camera section 100 and displaying a live view image using the acquired image (Step S106).

The controller 120 determines whether there exists the configuration information 154 (Step S108). When the configuration information 154 is classified for each type, the pieces of configuration information 154 of different types are classified as first configuration information 154a or second configuration information 154b.

The controller 120 determines whether the first configuration information 154a or the second configuration information 154b is stored in the memory 150. When the controller 120 has determined that there is no configuration information (NO in Step S108), the controller 120 moves on to FIG. 4C and determines whether the photographer has selected an acquisition of configuration information (Step S110).

The controller 120 causes the photographer to select, on a screen, whether configuration information is to be acquired. When the controller 120 has determined that the photographer has not selected an acquisition of configuration information (NO in Step S110), the controller 120 performs a usual photographing in which configuration information is not used (Step S118). When the first configuration information 154a or the second configuration information 154b is stored in the memory 150, whether other configuration information is further to be acquired may be selected on the screen.

When the controller 120 has determined that the photographer has selected an acquisition of configuration information (YES in Step S110), the controller 120 determines, by the photographer's selection, whether a type of configuration information to be acquired is an entire image (first configuration information 154a) (Step S112). When the controller 120 has determined that the entire image has been selected as a type of configuration information to be acquired (YES in Step S112), the controller 120 instructs the photographer to capture the entire image. Then, the entire image is captured by the photographer. The controller 120 records the entire image captured by the photographer in the memory 150 as the first configuration information 154a (Step S114).

On the other hand, when the controller 120 has determined that the type of configuration information 154 to be acquired is not an entire image, that is, that the selected type of configuration information 154 is a design drawing (NO in Step S112), the controller 120 acquires the design drawing information 422 from the memory 420 of the external apparatus 40 through the communication section 170 and records the design drawing information 422 in the memory 150 as the second configuration information 154b (Step S116). The controller 120 moves on to Step S108 after Step S114 or Step S116.

When the controller 120 has determined that there exists the configuration information 154 (YES in Step S108), the controller 120 causes the photographer to select the type of configuration information 154 to be used (Step S130). The guide screen creation section 136 creates a guide screen from an image formed by combining the selected configuration information 154 and a live view image. The controller 120 displays, on the display section 160, a guide screen that includes the configuration information 154 and the live view image (Step S132). The image of the configuration information and the live view image are displayed separately.

When only one of the first configuration information 154a and the second configuration information 154b is stored in the memory 150, Step S130 is omitted. Then, in Step S132, the configuration information 154 stored in the memory 150 is displayed.

Then, the measurement section 130 measures a portion size on the basis of the live view image. The guide screen creation section 136 adds a result of the measurement (the measured portion size) to the guide screen. The controller 120 displays the guide screen to which the measurement result has been added (Step S134).

FIG. 6 illustrates examples of guide screens each constituted of the first configuration information 154a. Guide screens 201 and 203 are screens each formed by combining a live view image and the first configuration information 154a. A guide screen 202 of FIG. 6 is a screen formed by combining a recorded-view image and the first configuration information 154a. The following are examples of screens in which a plurality of pillars P are sequentially photographed as a photographing target portion in a room in which the plurality of pillars P have been constructed as illustrated in FIG. 1A.

The first configuration information 154a of FIG. 6 is information in which three pillars P are photographing target portions. The configuration information 154 is an entire image (first configuration information 154a) of a room in which three pillars P have been constructed. This entire image is an image that has been captured and recorded in the memory 150 in advance. One of the pillars P that are currently being photographed by the camera section 100 is displayed on the live view image. The guide screen 201 is a screen in which the photographer is searching for a composition for photographing.

Then, the measurement section 130 measures the width of the pillar P as a portion size, on the basis of the live view image. A measurement value (30 cm) is displayed on the guide screen 201 as a portion size N1 of the guide screen 201.

Figure 7A:
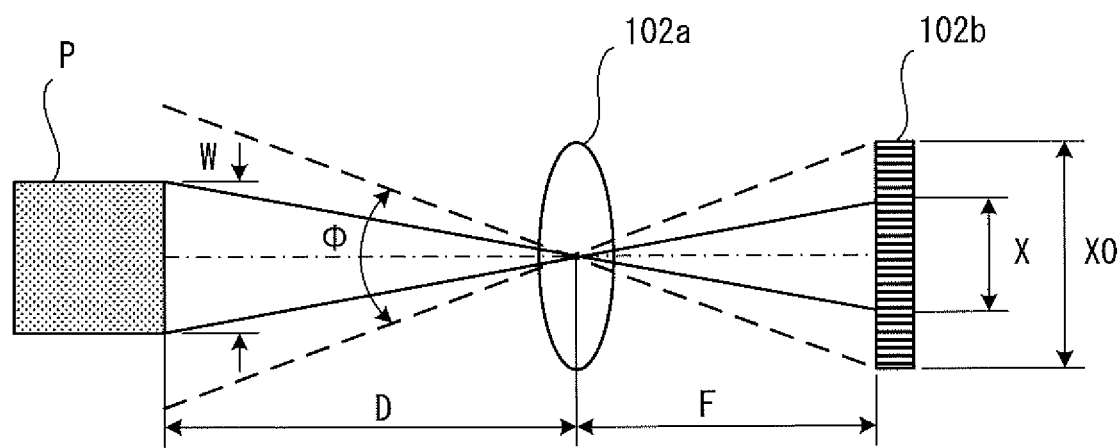
FIG. 7A illustrates a principle of measuring a portion size from a captured image, using a single-lens photographing section.
Figure 7B:
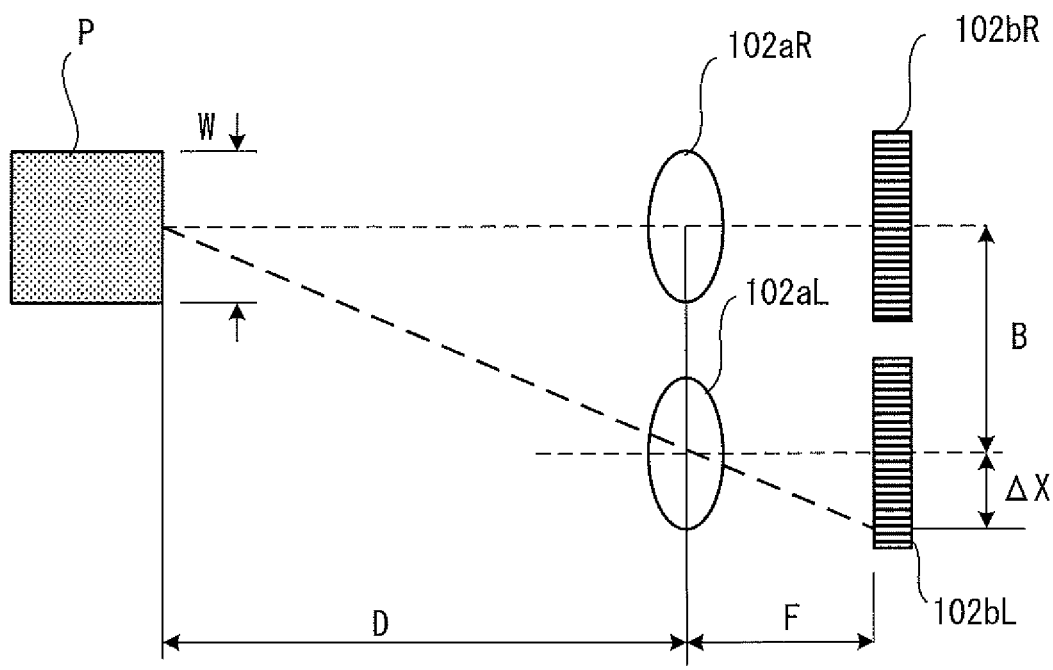
FIG. 7B illustrates the principle of measuring the portion size from the captured image, using a twin-lens photographing section.

FIGS. 7A and 7B are schematic diagrams for explaining a principle of measuring the portion size N1 (in this case, the width of the pillar P) from a captured image. Both FIGS. 7A and 7B illustrate the camera section 100 during photographing as viewed from above. FIG. 7A is an example of a single-lens photographing section 102, and FIG. 7B is an example of a twin-lens photographing section 102.

In FIG. 7A, W is a width of a portion (the pillar P), X0 is a width of the imaging element 102b, φ is a field angle of the lens 102a, F is a focal length of the lens 102a, and D is a photographing distance. The width X0, the field angle φ, and the focal length F are included in the camera-section characteristics information 156. The photographing distance D is calculated by the photographing distance calculator 132 using a detected focal position. When the photographing section 102 is a single-lens type, the width W of the pillar P is calculated using the following formulas.

$$W = D \times X/F \quad \text{Formula (1)}$$

$$\phi = 2 \times \arctan(X0/(2 \times F)) \quad \text{Formula (2)}$$

Strictly speaking, F (focal length) in Formula (2) is an image plane distance obtained by adding, to the focal length F, an image plane movement that occurs due to focusing (or a fixed image plane distance in the case of a fixed focus system), but F is used to simplify the description. As used herein, descriptions may be similarly simplified without any explanation in advance.

In FIG. 7B, a lens 102aR and an imaging element 102bR are a lens and an imaging element on the right side as viewed from the photographer. A lens 102aL and an imaging element 102bL are a lens and an imaging element on the left side as viewed from the photographer. B is a parallax when viewed from the right and left imaging elements 102b, and ΔX is a relative image position. The center of the pillar P is arranged on an optical axis of the lens 102aR. When the photographing section 102 is a twin-lens type, the photographing distance D is calculated by the photographing distance calculator 132 using the parallax B and the relative image position ΔX.

$$D = F \times B/\Delta X \quad \text{Formula (3)}$$

D, which is calculated in Formula (3), is used to calculate W in Formula (1).

Return to FIG. 4A. The controller 120 determines whether a manipulation has been performed by the photographer (Step S136). The manipulation performed by a photographer is, for example, a zoom manipulation of the manipulation section 106. When the controller 120 has determined that a manipulation has been performed by the photographer (YES in Step S136), the imaging controller 124 performs a control while reflecting a result of the manipulation (Step S138).

When the controller 120 has determined that no manipulation has been performed by the photographer (NO in Step S136), the controller 120 waits for a photographing instruction (Step S140). The photographing instruction may be issued in various forms. In this case, the photographing instruction is issued when a specific portion in the configuration information 154 is clicked on the guide screen 201.

It is assumed that the photographer aims the camera section 100 at a rightmost pillar P among the three pillars and clicks the rightmost pillar P in the first configuration information 154a, as illustrated in the guide screen 201 of FIG. 6. Then, the controller 120 has determined that a photographing instruction has been issued (YES in Step S140), and performs photographing and measurement (Step S142). The measurement section 130 measures the width of the photographed pillar. The photographed portion determination section 128 has determined that the photographing target portion is the rightmost pillar P because the rightmost pillar P in the first configuration information 154a has been clicked.

After performing photographing, the controller 120 displays the guide screen 202 of FIG. 6. The guide screen 202 is created by the guide screen creation section 136. A recorded-view image is displayed on the left side of the guide screen 202. The measurement section 130 measures the width of the pillar P on the basis of the recorded-view image. Then, the guide screen creation section 136 displays, as a portion size N1, a result of the measurement (30 cm) of the width of the pillar P performed by the measurement section 130. Further, the guide screen creation section 136 adds an OK button to the lower portion of the first configuration information 154a. The OK button is a button for causing the photographer to determine whether a photographing result is OK.

When the controller 120 has determined that no photographing instruction has been issued (NO in Step S140), the controller 120 returns to Step S104. The controller 120 determines whether the OK button has been clicked (Step S144). When the controller 120 has determined that the OK button has not been clicked, the controller 120 returns to Step S104 (NO in Step S144).

When the controller 120 has determined that the OK button has been clicked (YES in Step S144), the controller 120 records, in the memory 150, a photographing result in association with the configuration information 154 (Step S146). Specifically, the controller 120 records, in the memory 150, a result of the determination (for example, the pillar P situated rightmost in the first configuration information 154a has been photographed) performed by the photographed portion determination section 128. Further, the controller 120 records a captured image and a result of measurement of a portion size (for example, the width of a pillar) in the memory 150.

A manipulation of issuing a photographing instruction and a manipulation of selecting a photographing target portion in the configuration information 154 may be separately performed. Specifically, a manipulation of pressing down a release button (not illustrated) may be performed as the manipulation of issuing a photographing instruction, and a manipulation of clicking a specific portion in the first configuration information 154a on the guide screen 201 may be performed as the manipulation of selecting a photographing target portion. Further, with respect to the order of performing the manipulation of issuing a photographing instruction and the manipulation of selecting a photographing target portion, either one may be performed first. The photographed portion determination section 128 determines a photographed portion on the basis of a position clicked in the first configuration information 154a.

The controller 120 displays a guide screen in which an electronic marker indicating a photographing state has been added to the configuration information (Step S148). An electronic marker Q is an example of state information. The guide screen 203 of FIG. 6 is an example of a screen in which the electronic marker Q on which "finished" is given has been added to a photographed portion (pillar P). The guide screen creation section 136 adds the electronic marker Q that is state information to a photographed portion, on the basis of the determination performed by the photographed portion determination section 128. The controller 120 returns to Step S104.

Further, when the controller 120 has determined that the construction photographing mode has not been selected (NO in Step S104), the controller 120 determines whether the image reproduction mode has been selected (Step S160).

When the controller 120 has determined that the image reproduction mode has been selected (YES in Step S160), the controller 120 reproduces an image (Step S162). The controller 120 determines whether an instruction to change the reproduction target image has been issued (Step S164), and when the controller 120 has determined that the instruction to change the reproduction target image has been issued (YES in Step S164), the controller 120 changes the reproduction target image according to the instruction (Step S166). When the controller 120 has determined that the instruction to change the reproduction target image has not been issued (NO in Step S164), the controller 120 returns to Step S104.

When the controller 120 determines that the image reproduction mode has not been selected (NO in Step S160), the controller 120 determines whether the design drawing acquisition mode has been selected (Step S170). When the controller 120 determines that the design drawing acquisition mode has been selected (YES in Step S170), the controller 120 makes a request of the external apparatus 40 for the design drawing information 422 through the communication section 170, and receives the design drawing information 422 transmitted from the external apparatus 40 (Step S172). The process of Step S172 is similar to the process of Step S116 described above. The controller 120 records the received design drawing information 422 in the memory 150 as the second configuration information 154b.

The processing of displaying a guide screen that is constituted of the second configuration information 154b based on the received design drawing information 422 is briefly described below.

Figure 8:
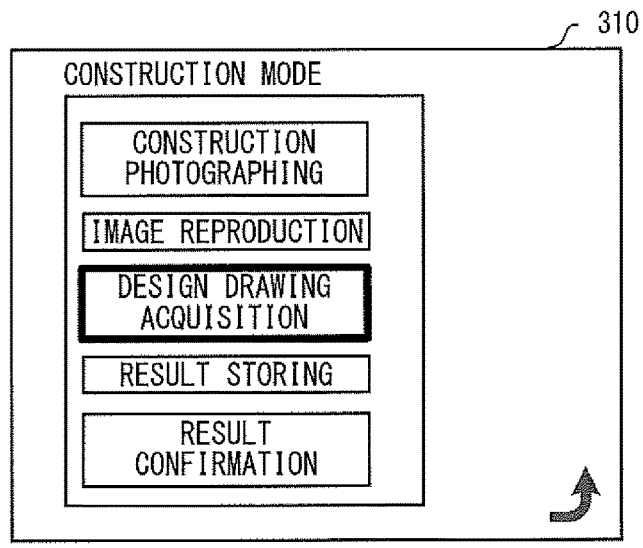
FIG. 8 illustrates examples of setting screens upon acquiring a design drawing.
Figure 8:
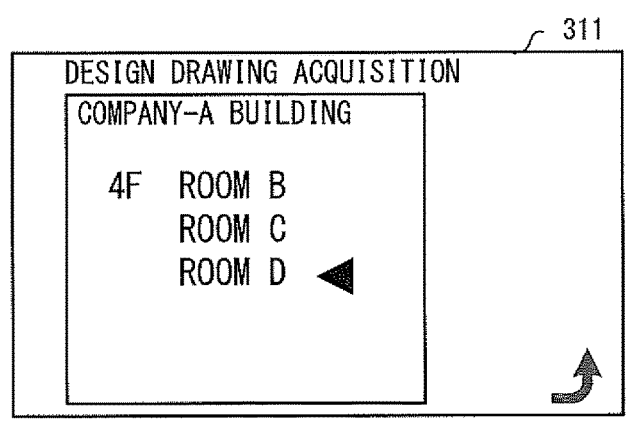
Figure 8:
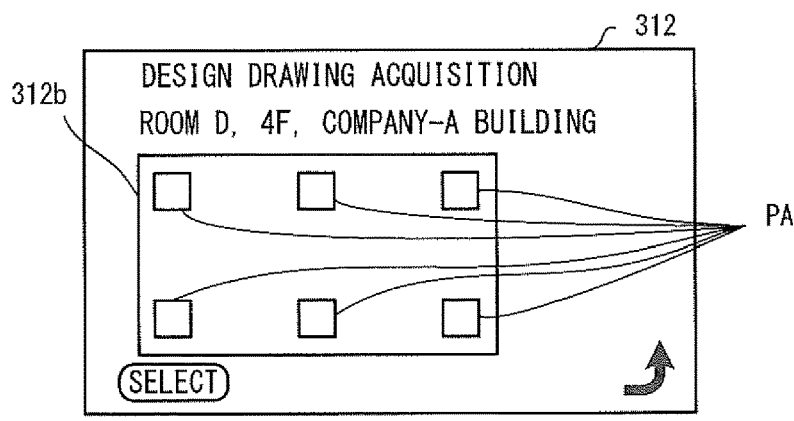

A setting screen 310 of FIG. 8 is an example of a setting screen upon acquiring a design drawing. When the design drawing acquisition mode has been selected on the setting screen 310 for setting a construction mode, a design drawing is acquired from the external apparatus 40. A setting screen 311 of FIG. 8 is a screen for selecting a concrete place to be displayed from the acquired design drawing. The photographer moves a cursor so as to select a location of the configuration information to be displayed.

A setting screen 312 of FIG. 8 is a screen on which a design drawing 312b of a location selected on the setting screen 311 (room D, 4F, company-A building) has been displayed. The design drawing 312b presents a state in which six pillars PA are arranged in the room. When a SELECT button on the setting screen 312 is clicked, the displayed design drawing of the room D on the fourth floor in the company-A building is selected as the second configuration information 154b.

Figure 9:
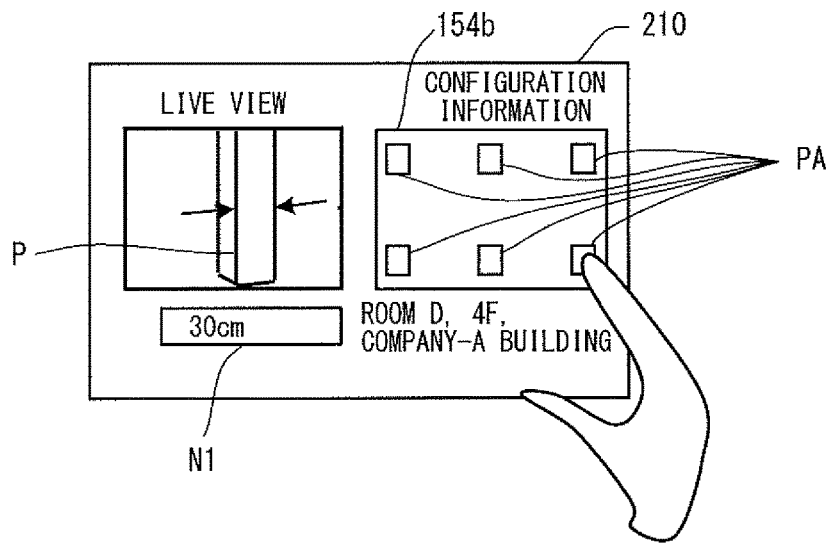
FIG. 9 illustrates examples of guide screens that are constituted of second configuration information based on a design drawing.
Figure 9:
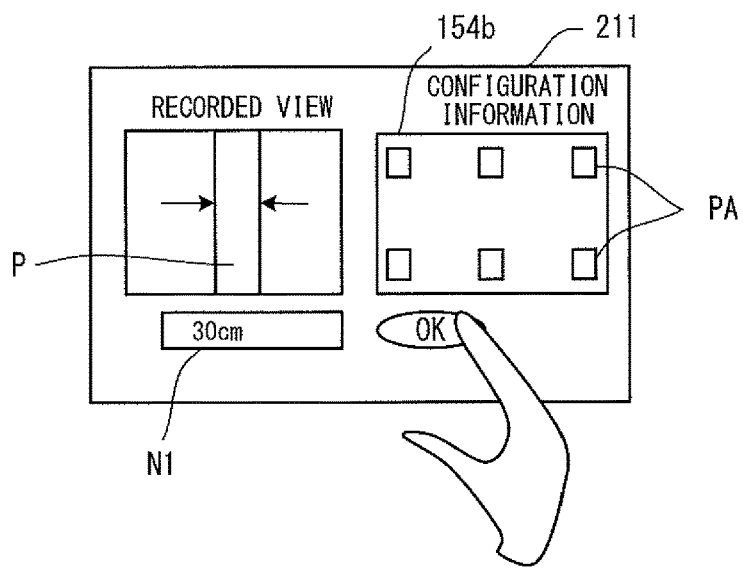
Figure 9:
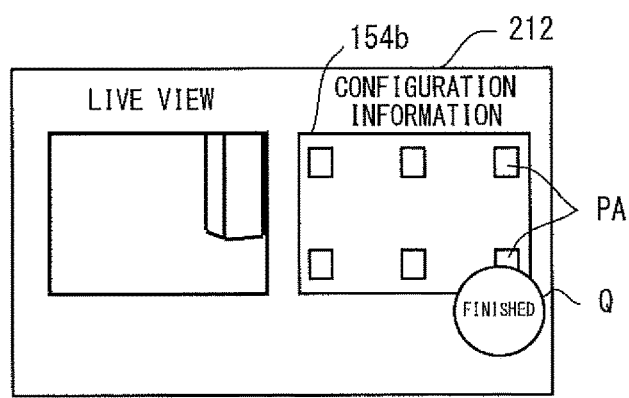

FIG. 9 illustrates examples of guide screens constituted of the second configuration information 154b. The guide screen creation section 136 extracts, as the second configuration information 154b, a place selected by the photographer from a design drawing, so as to create a guide screen 210. Guide screens 210 to 212 of FIG. 9 are screens obtained by replacing the first configuration information 154a for the guide screens 201 to 203 of FIG. 6 described above with the second configuration information 154b.

When the pillar PA situated on the right in the lower portion of the second configuration information 154b is clicked on the guide screen 210 and an instruction to photograph the clicked pillar PA is issued, the guide screen 211 is displayed after the photographing is performed. Further, when an OK button is clicked on the guide screen 211, the guide screen 212 in which the electronic marker Q indicating that the photographing has been finished has been added to the pillar PA situated on the right in the lower portion of the second configuration information 154b is displayed.

Figure 10A:
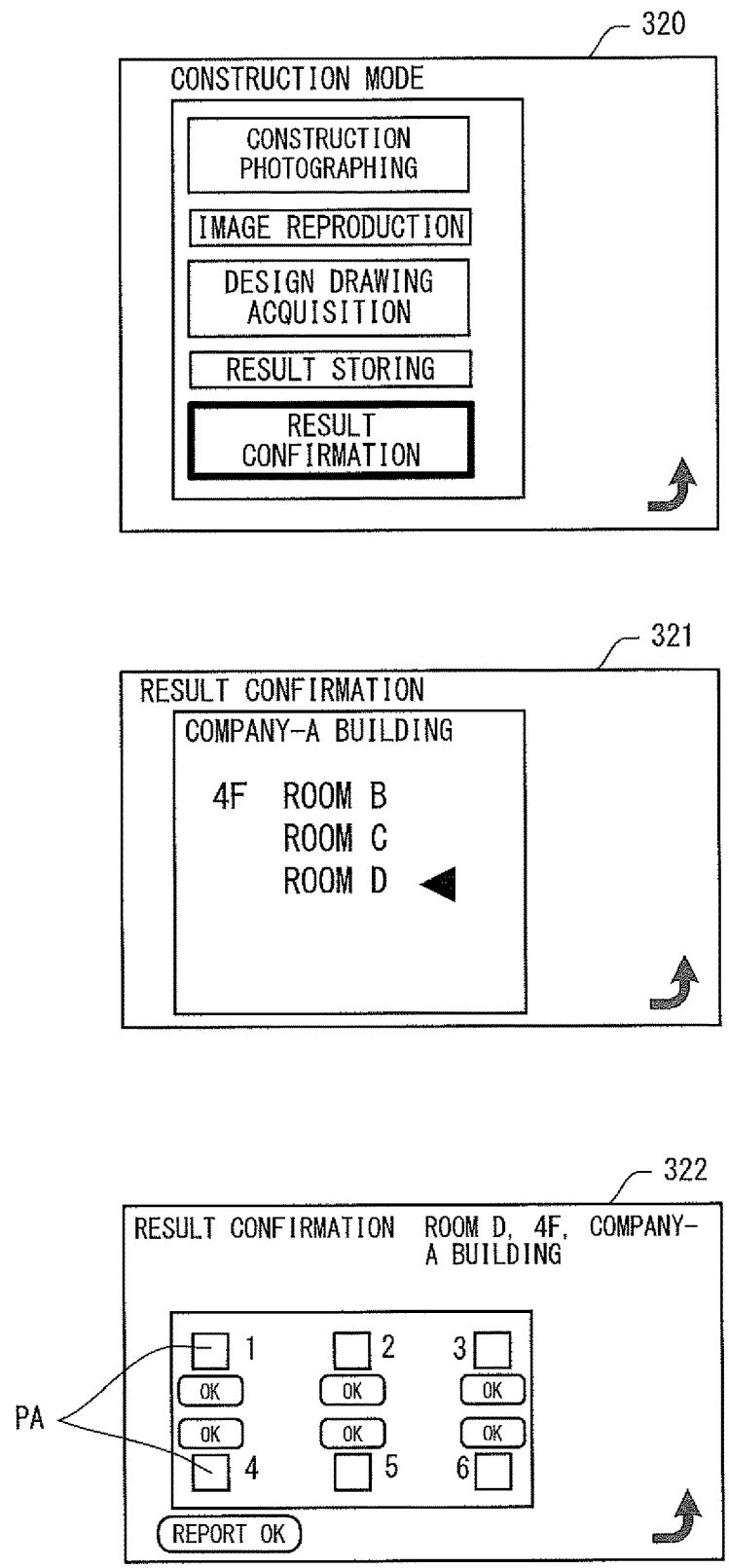
FIG. 10A illustrates examples of screens displayed in "result confirmation"

Return to Step S170 of FIG. 4B. When the controller 120 has determined that the design drawing acquisition mode has not been selected (NO in Step S170), the controller 120 determines whether the result confirmation mode has been selected (Step S180). The process of the result confirmation mode is described with reference to each setting screen illustrated in FIGS. 10A and 10B. FIG. 10A illustrates a setting screen 320 in which the result confirmation mode has been selected as a construction mode.

When the controller 120 has determined that the result confirmation mode has been selected (YES in Step S180), the controller 120 performs a location selection display (Step S182). The location selection display is displaying a screen for selecting a location for which a result is to be confirmed. A setting screen 321 of FIG. 10A is an example of a screen for selecting a location for which a result is to be confirmed. In this case, it is assumed that the room D on the fourth floor in the company-A building of FIG. 9 described above has been selected to be a location for which a result is to be confirmed. A setting screen 322 of FIG. 10A indicates a result of photographing the selected room D on the fourth floor in the company-A building.

On the setting screen 322, state information indicating a respective number and a respective photographing state is added to each of the six pillars PA in the design drawing. An OK mark is one of the pieces of state information indicating a photographing state of each of the pillars PA. The OK mark indicates that the pillar PA has been photographed and a measurement value of the pillar PA (the width of the pillar) meets the standards.

The controller 120 determines whether an instruction to create a report about a photographing result has been issued (Step S184). When "REPORT OK" on the setting screen 322 of FIG. 10A has been clicked, the controller 120 determines that the instruction to create a report has been issued.

When the controller 120 has determined that the instruction to create a report has not been issued (NO in Step S184), the controller 120 does not create the report. When, for example, the pillar PA with number 3 has been clicked on a guide screen of the setting screen 322, the controller 120 displays a screen for confirming details, as described in a setting screen 323 of FIG. 10B (Step S188). A captured image (an evidence image) and a measurement value of the pillar PA with number 3 that are stored in the memory 150 are displayed on the screen for confirming details.

Figure 10B:
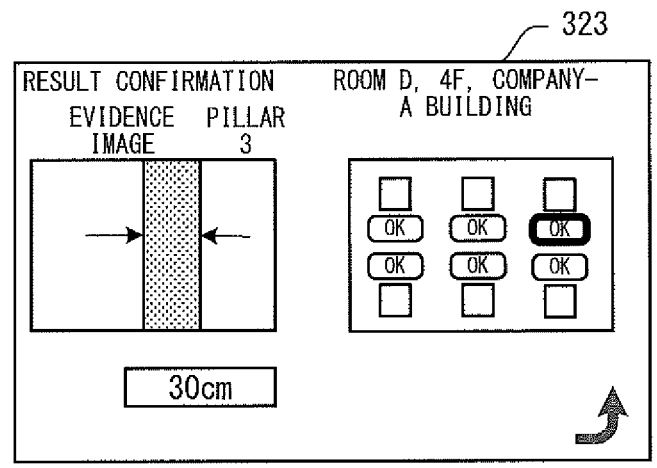
FIG. 10B illustrates examples of screens displayed in "result confirmation"
Figure 10B:
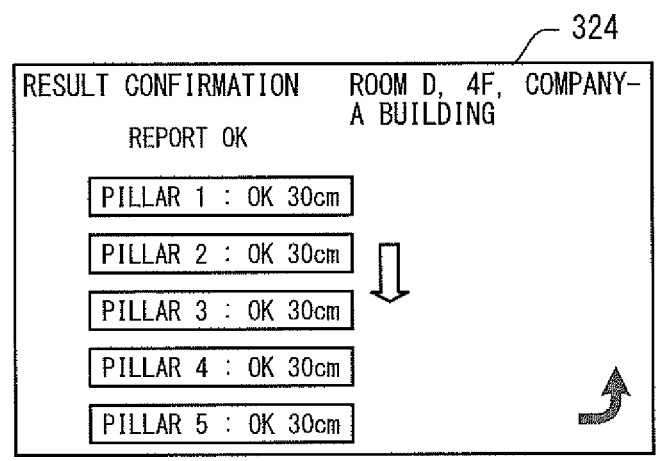

When the controller 120 has determined that the instruction to create a report has been issued (YES in Step S184), the controller 120 displays a created report on a text basis (Step S186). A setting screen 324 of FIG. 10B is an example of displaying a created report on a text basis.

When the controller 120 has determined that the result confirmation mode has not been selected (NO in Step S180), the controller 120 determines whether the result storing mode has been selected (Step S190). When the controller 120 has determined that the result storing mode has been selected (YES in Step S190), the controller 120 transmits a photographing result to the external apparatus 40 (Step S192). The photographing results include, for example, a captured image and a report created in Step S186. The external apparatus 40 stores the transmitted photographing result in the memory 420. When the controller 120 has determined that the result storing mode has not been selected (NO in Step S190), the controller 120 returns to Step S104. The controller 120 also returns to Step S104 after Step S166, Step S172, Step S186, Step S188, or Step S192.

Figure 11:
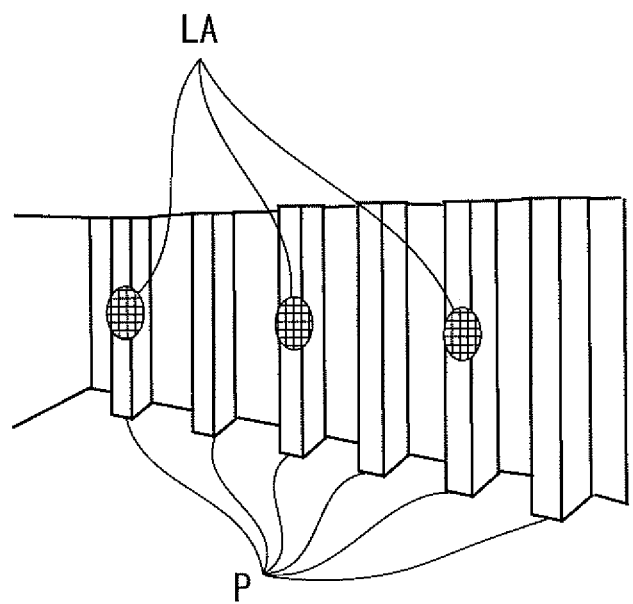
FIG. 11 is a diagram that illustrates another solution to avoid forgetting to perform photographing and to avoid performing redundant photographing.
Figure 11:
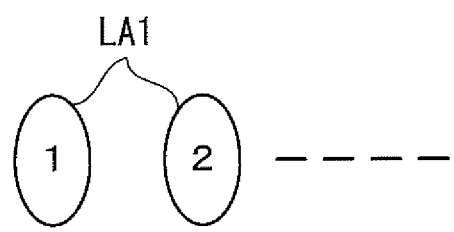
Figure 11:
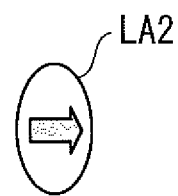

FIG. 11 is a diagram that illustrates another solution to avoid forgetting to perform photographing and to avoid performing redundant photographing when there are many portions to be photographed that have substantially the same size. An identification marker LA is attached to a photographing target pillar P before photographing is performed. The photographer can avoid forgetting to perform photographing and avoid performing redundant photographing by proceeding with performing photographing while confirming the identification marker LA. FIG. 11 illustrates an example of attaching an identification marker LA to every other pillar P.

Further, individual information may be added to the identification marker LA. For example, an identification marker LA1 is an example of the identification marker LA to which a serial number indicating a photographing order is given. An identification marker LA2 is an example of the identification marker LA to which an arrow indicating a direction of a photographing order is given.

The guide screen display processing according to the first embodiment described above makes it possible to avoid forgetting to perform photographing and to avoid performing redundant photographing without confirming a photographing target place and a photographing content indicated in each construction place in a design drawing while referring to, for example, the design drawing, because a guide screen presenting state information indicating a photographing state is displayed according to the progress of photographing.

Second Embodiment

Guide screen display processing according to a second embodiment includes setting a photographing range in accordance with a requested measurement accuracy; and displaying, on a guide screen, configuration information in which the photographing range has been added to a portion in the configuration information. The configuration of the information acquisition system 1 and hardware of the information acquisition apparatus 10 are similar to those of the first embodiment, so their descriptions are omitted.

Figure 12A:
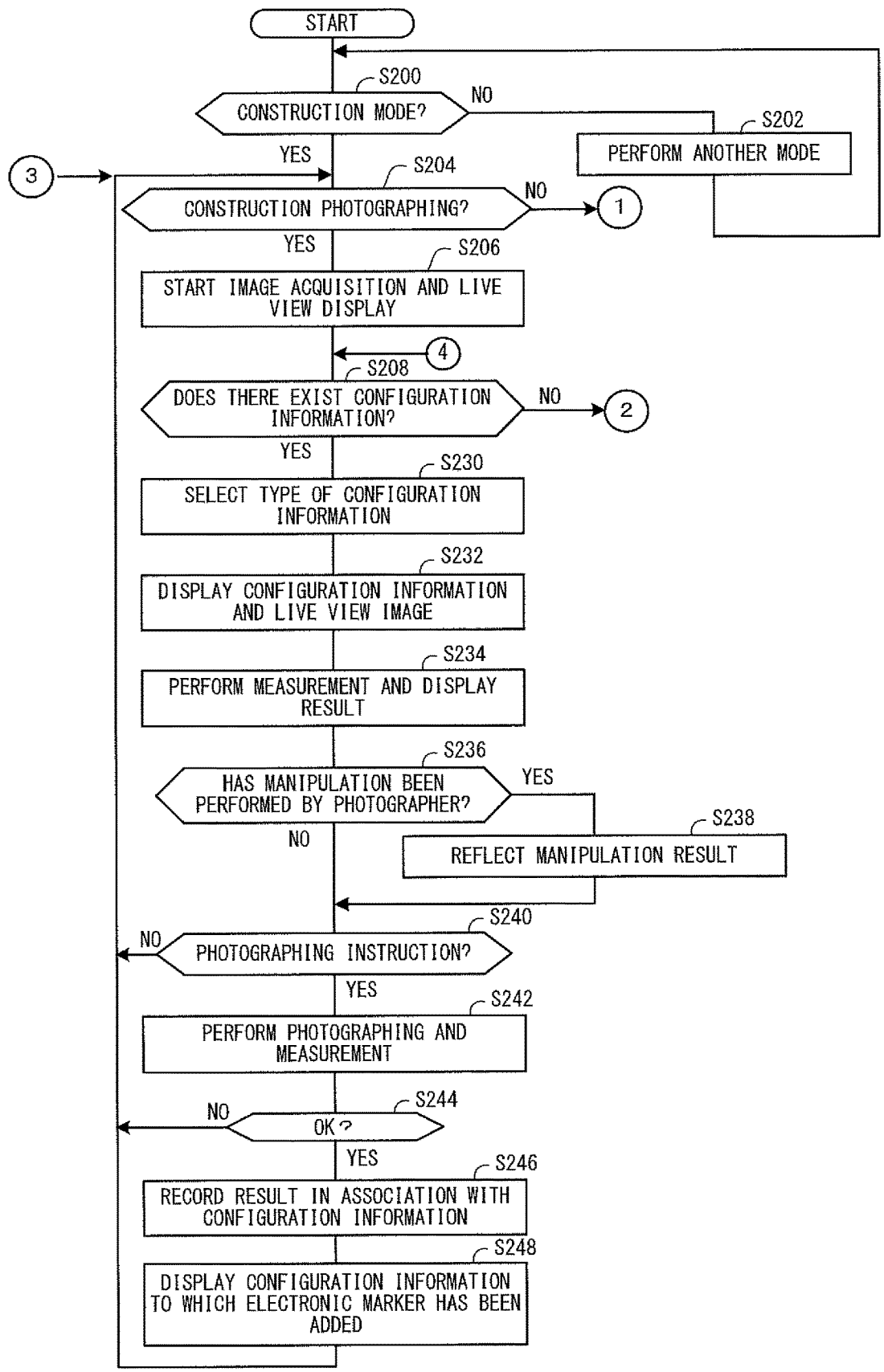
FIG. 12A is part 1 of a flowchart that illustrates guide screen display processing according to a second embodiment.
Figure 12B:
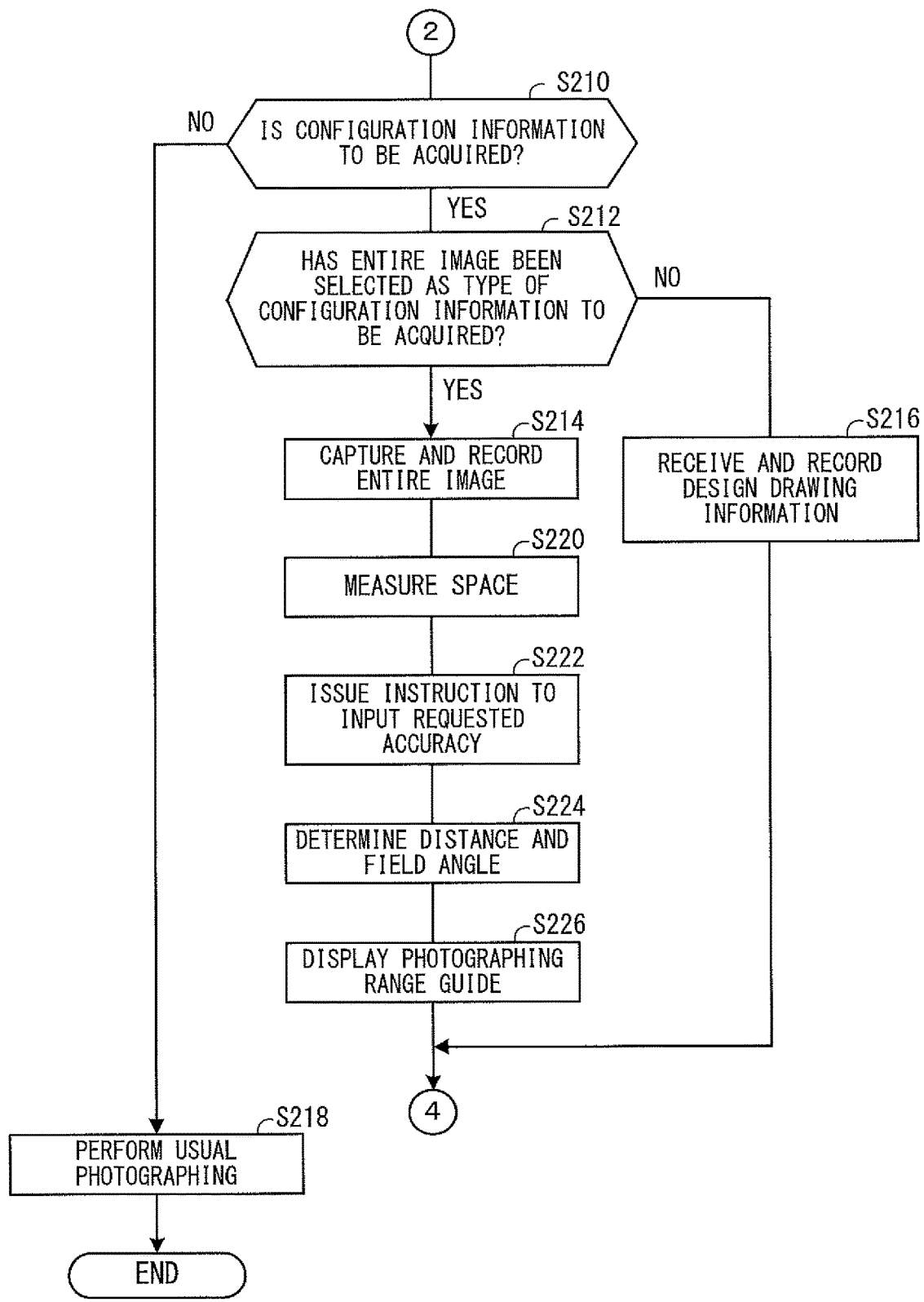
FIG. 12B is part 2 of the flowchart that illustrates the guide screen display processing according to the second embodiment.

FIGS. 12A and 12B are part 1 and part 2 of a flowchart that illustrates the guide screen display processing according to the second embodiment. Processes that are different from those in the processing of the first embodiment are described, and processes that are similar to those in the processing of the first embodiment are omitted. The flowchart of FIG. 4B is shared by the first embodiment and the second embodiment, so its description is omitted.

Step S200 to Step S216 and Step 230 to Step S248 in FIGS. 12A and 12B are similar to Step S100 to Step S116 and Step S130 to Step S148 in FIG. 4A, so their descriptions are omitted. Step S220 to Step S226 in FIG. 12B are unique to the second embodiment.

Figure 13:
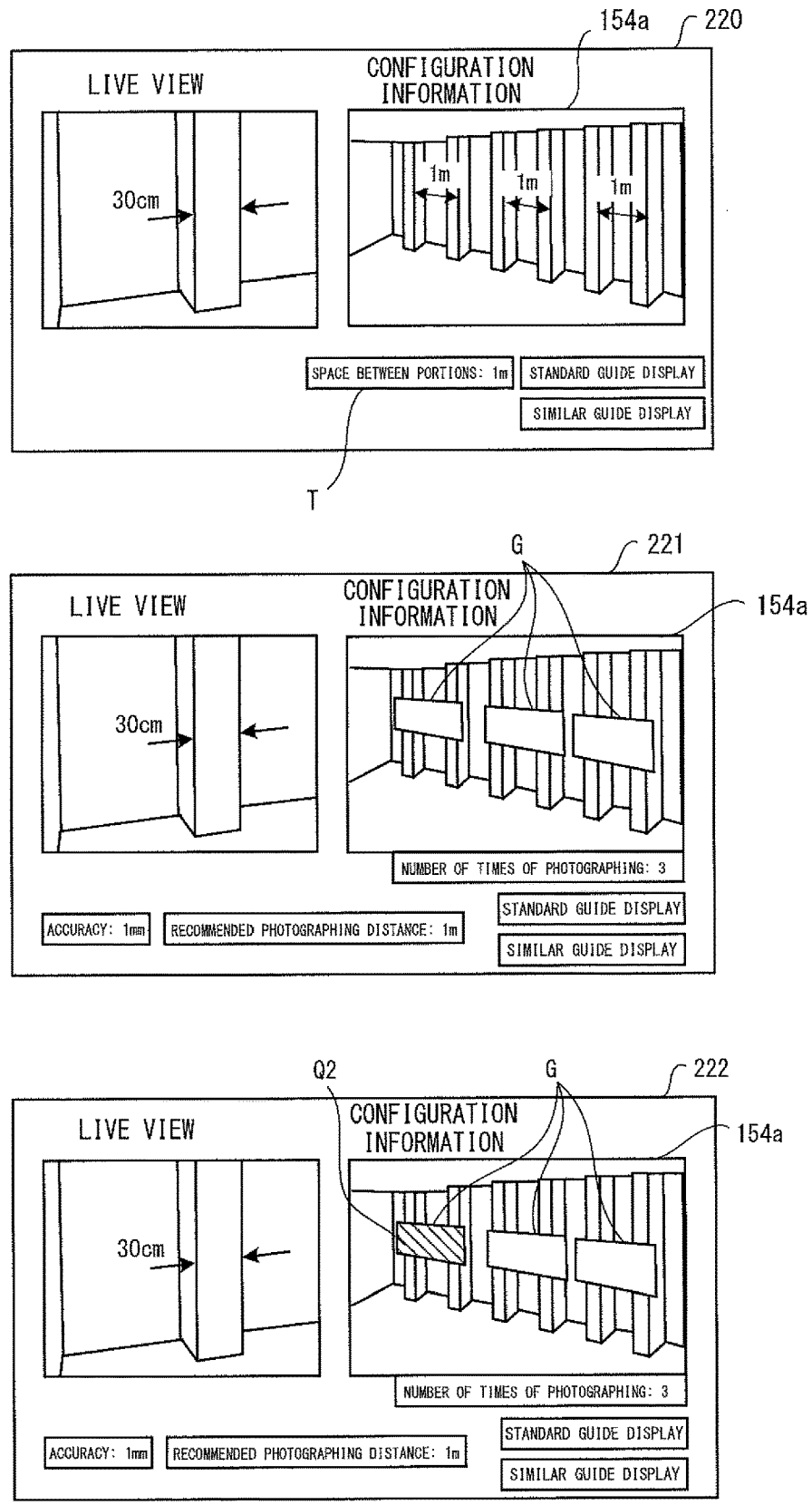
FIG. 13 illustrates guide screens on which a photographing range guide G is displayed according to the second embodiment.

FIG. 13 is referred to as needed in the following descriptions. FIG. 13 illustrates examples of guide screens on which the first configuration information 154a is displayed as configuration information. The measurement section 130 measures a space T between portions (pillars) to be photographed on the basis of a live view image (Step S220). The guide screen creation section 136 creates a guide screen 220 (FIG. 13) to which information on the space T between pillars (1 m) has been added. The guide screen 220 is provided with a button that causes reference information created by the reference information creation section 135 to be displayed. "STANDARD GUIDE DISPLAY" is a button that causes a standard photographing guide to be displayed. "SIMILAR GUIDE DISPLAY" is a button that causes a similar photographing guide to be displayed.

Figure 14A:
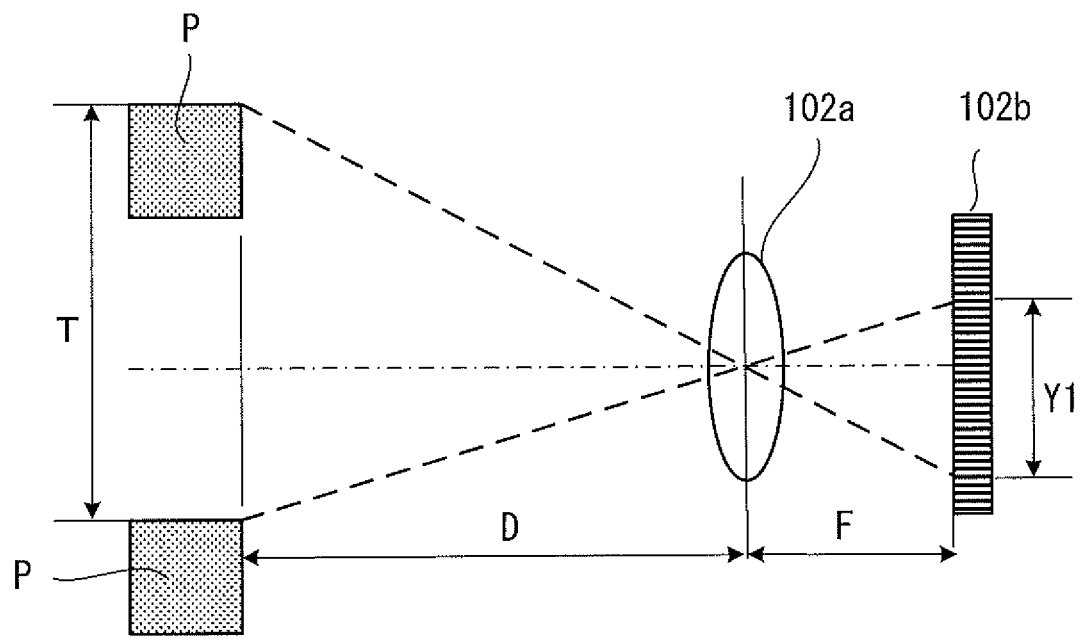
FIG. 14A illustrates a principle of measuring a space between pillars using an image captured from the front.
Figure 14B:
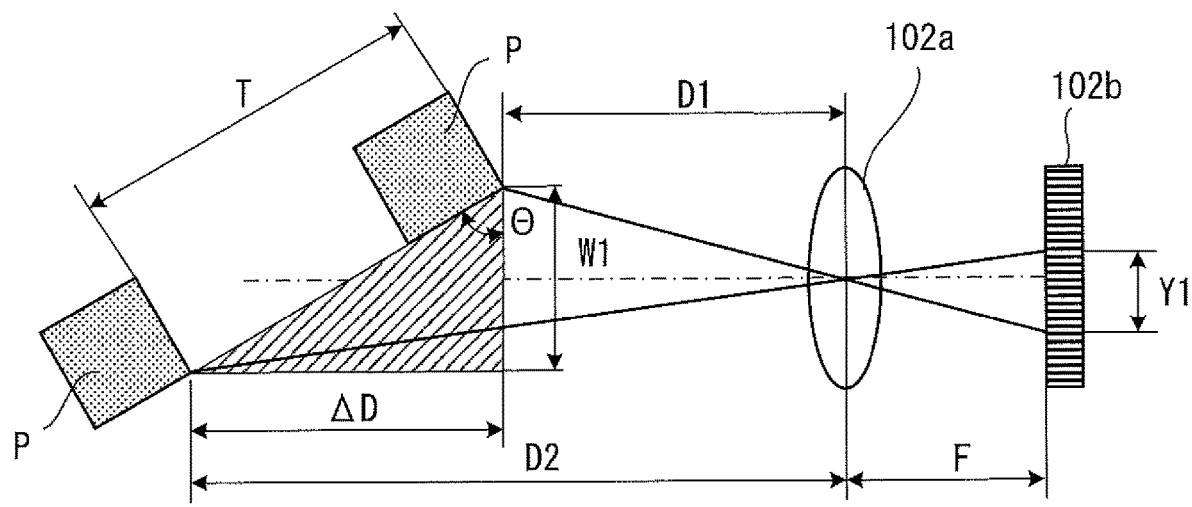
FIG. 14B illustrates the principle of measuring the space between pillars using an image captured from an oblique direction.

FIGS. 14A to 14C illustrate a principle of measuring a space between pillars using a captured image.

FIG. 14A illustrates a case in which the pillar P is photographed from the front. In FIG. 14A, T is a space between pillars P, F is a focal length of the lens 102a, Y1 is an image width, and D is a photographing distance. The focal length F is included in the camera-section characteristics information 156. The photographing distance D is calculated by the photographing distance calculator 132 by, for example, detecting a focal position. The space T between pillars P is calculated using Formula (4) below.

$$T = D \times Y1 / F \qquad \text{Formula (4)}$$

FIG. 14B illustrates a case in which the pillar P is photographed from an oblique direction. In FIG. 14B, T is a space between pillars P, F is a focal length of the lens 102a, Y1 is an image width, and D1 and D2 are photographing distances. The focal length F is included in the camera-section characteristics information 156. The photographing distances D1 and D2 are calculated by the photographing distance calculator 132 by, for example, detecting a focal position. The space T between pillars P is calculated using Formulas (5) and (6) below.

$$\Delta D = D2 - D1 \qquad \text{Formula (5)}$$

$$T = W1/\cos\theta = W1/\cos(\arctan(\Delta D/W1)) \qquad \text{Formula (6)}$$

As described above, the space T between pillars P can be calculated not only when an image is captured using the camera section 100 situated right in front of the pillar P but also when the image is captured from an oblique direction. An entire image is easily captured by performing photographing from an oblique direction, which results in an increase in flexibility in photographing.

FIG. 14C is a case in which a foundation of a floor, or a girder or a beam of a ceiling is photographed. This case is also described because the portion to be photographed is not limited to a vertical member such as a pillar. For example, P is a member of a floor. When photographing a member of a floor, the photographer orients the camera section 100 obliquely downward to perform photographing, as illustrated in FIG. 14C. The tilt of the camera section 100 is detected by the posture sensor 110. The space T between foundations P is calculated using Formulas (7) and (8) below.

$$\Delta D = D2 - D1 \qquad \text{Formula (7)}$$

$$T = W1/\cos\theta \qquad \text{Formula (8)}$$

Return to FIG. 12B. The controller 120 instructs the photographer to input a requested measurement accuracy (Step S222). When the requested measurement accuracy has already been input, the controller 120 does not perform this processing. For example, it is assumed that 1 mm has been input as a requested accuracy with respect to the pillar P.

The controller 120 determines a photographing distance and a field angle (Step S224). The photographing range setting section 134 calculates a photographing distance for satisfying a requested measurement accuracy. The greater the requested measurement accuracy, the shorter the photographing distance is calculated to be. As described above, the photographing range setting section 134 calculates the photographing distance for satisfying a requested measurement accuracy, on the basis of the characteristics of the camera section 100 (such as an MTF and a distortion of the lens 102a, and a resolving power of the imaging element 102b). The characteristics of the camera section 100 are included in the camera-section characteristics information 156.

The photographing range setting section 134 sets a photographing range for satisfying a requested measurement accuracy, on the basis of the calculated photographing distance and the characteristics of the camera section 100. The guide screen creation section 136 adds a photographing range guide G to a predetermined position in the configuration information 154. The controller 120 displays a guide screen in which the photographing range guide G has been added to the predetermined position in the configuration information 154 (Step S226).

A guide screen 221 of FIG. 13 is an example of a guide screen in which the photographing range guide G has been added. "ACCURACY: 1 mm" on the guide screen 221 is an input requested accuracy. "RECOMMENDED PHOTOGRAPHING DISTANCE: 1 m" is a distance that is calculated such that the requested accuracy is satisfied. The photographing range guide G indicating a photographing range in the form of an image is displayed on the first configuration information 154a. The photographing range guide G indicates a range that can be photographed with the recommended photographing distance: 1 m. A composition in which two pillars are situated on the right side and the left side of the screen is proposed using the photographing range guide G. A left portion of the screen is a live view image. This requested accuracy may be input manually, or it may be a value that has been recorded in advance. Further, the requested accuracy is not always a fixed value, and it may be a value that is changed according to the determination performed on the target on the basis of an image or a state, or on the basis of a requested output form.

On the guide screen 221, it is recommended that a range including the first and the second pillars P from the left be photographed in the first photographing, a range including the third and the fourth pillars P from the left be photographed in the second photographing, and a range including the fifth and the sixth pillars P from the left be photographed in the third photographing. Information indicating that the number of times of photographing is three is also displayed on the guide screen 221. The requested accuracy is also satisfied when the six pillars P are sequentially photographed from a distance that is less than 1 m, but the requested accuracy is satisfied with a higher degree of efficiency when two pillars are photographed at the same time.

A guide screen 222 of FIG. 13 is a screen after the first photographing is finished. A guide range guide G covering the first and the second pillars P is represented with, for example, a hatching Q2. The hatching Q2 corresponds to the electronic marker Q of FIG. 6. In other words, the hatching Q2 is state information. Accordingly, it has become clear that the first and the second pillars P have been photographed.

It is preferable that a guide screen be created while also considering whether it is actually possible to perform photographing. For example, the guide screen creation section 136 may acquire information such as a structure of a building or a dangerous location from, for example, an external database and may also determine whether it is actually possible to perform photographing as indicated by a guide screen. In other words, the guide screen creation section 136 may also determine a photographing location from a field angle or a photographing distance that corresponds to a photographing range indicated by the guide screen. Further, the guide screen creation section 136 may also determine whether the determined photographing position is appropriate with reference to map information. In this case, the guide screen creation section 136 may recommend performing photographing from an oblique direction, not from the front, as illustrated in FIG. 14B described above. It is sufficient if the guide screen creation section 136 estimates whether the location is still safe when photographing is performed from the oblique direction. In addition to a method including temporally determining a photographing range guide; and verifying a photographing location, a method including obtaining a photographing area or accuracy as needed using a safe and appropriate location candidate (which is determined using, for example, a map, a ground plan, or design data of a building) and determining a photographing location may also be used.

Figure 15B:
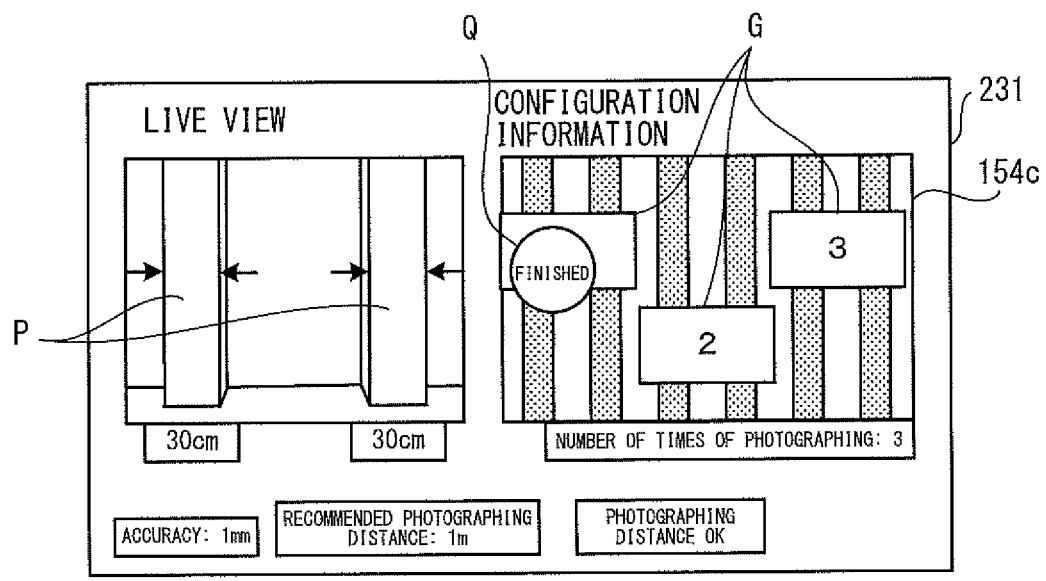
FIG. 15B illustrates an example of a guide screen on which third configuration information has been displayed according to the second embodiment.

FIGS. 15A to 15C illustrate examples of another aspect of the photographing range guide G. FIG. 15A illustrates an example of a guide screen that includes the second configuration information 154b. A guide screen 230 including the second configuration information 154b is an example in which the photographing range guide G has been displayed by horizontal lines. An electronic marker Q similar to that of the guide screen 203 of FIG. 6 is displayed on the photographing range guide G whose range has been photographed. Further, "PHOTOGRAPHING DISTANCE OK" displayed on the guide screen 230 indicates that a current photographing distance is included in a recommended photographing distance. The current photographing distance is calculated by the photographing distance calculator 132.

FIG. 15B illustrates an example of a guide screen that includes the configuration information 154 in a new form. The configuration information 154 in a new form indicates a state in which six pillars P are placed in a planar manner, and is referred to as third configuration information 154c.

On a guide screen 231, three photographing range guides G are displayed so as to cover respective pillars P. The number (1, 2, 3) given on the photographing range guide G indicates the photographing order. The electronic marker Q indicating that photographing has been finished is displayed as state information on the photographing range guide G with number 1.

FIG. 15C illustrates an example of a guide screen, a guide screen 232, on which a plurality of captured images connected to one another like a panoramic image have been displayed. The third configuration information 154c of FIG. 15B is displayed as configuration information. On the guide screen 232, it is recommended that images be captured such that a picture in an edge portion of one image is the same as the picture in an edge portion of another image. Thus, the photographing range guide G in which an edge portion of a certain captured image overlaps an edge portion of another captured image is displayed on the third configuration information 154c of the guide screen 232. The guide screen 232 of FIG. 15C presents a state of the second photographing after the first photographing is finished.

A horizontally oriented image that is displayed in the lower portion of the guide screen 232 is an image obtained by combining two images. The left portion is the already captured first image (recorded-view image). The right portion is the second image that is a live view image. The central portion V is an overlapping portion of the first image and the second image.

The guide screen display processing according to the second embodiment described above makes it possible to avoid forgetting to perform photographing and to avoid performing redundant photographing without confirming a photographing target place and a photographing content indicated in each construction place in a design drawing while referring to, for example, the design drawing. In addition, it also becomes possible to easily appropriately capture a construction-related image because a photographing range for satisfying a requested accuracy with respect to the measurement of a portion is clearly specified.

In addition to the measurement of a portion in a building described above, a group of buildings in a specific area, trees in a forest, crops in a field, and animals and plants in other areas may be considered to be target portions. From a macroscopic perspective, the embodiments of the present invention are also applicable to a three-dimensional measurement of, for example, a component, a wiring pattern, or a semiconductor that is performed by use of a microscope image, if they are considered to be target portions.

In other words, the embodiments described above are applicable if they are used to measure portions grouped in a specific area appropriately, accurately, and efficiently. Further, when the shapes of those target portions are not as simple as the shapes of portions in a building, various steps of image processing may be added to a determination of a start point and an end point of a target portion or to a simple determination of a contour such as an edge reinforcement, in order to facilitate the determination. Furthermore, an exemplary model image and an exemplary model measurement may be machine-learned by an artificial intelligence using an image captured in the past and a measurement result as the exemplary model image and the exemplary model measurement, so as to perform a determination using a result of the machine learning.

The embodiments described above can provide an information acquisition apparatus that presents an appropriate photographing guide for proceeding with photographing efficiently. It is often the case that there is a need to photograph all of the construction places of the same type (such as a pillar, a wall, a girder, and a foundation) when photographing is performed at a construction site. However, it takes much time and effort to confirm a photographing target place and a photographing content indicated in each construction place in a design drawing while referring to, for example, the design drawing, and to photograph all of the photographing targets, and problems such as forgetting to perform photographing and performing redundant photographing are likely to occur. The photographing guide screens according to the embodiments described above make it possible to proceed with photographing efficiently.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modifications and applications are possible without departing from the spirit of the present invention.

EXPLANATIONS OF LETTERS OR NUMERALS 1 information acquisition system
10 information acquisition apparatus
40 external apparatus
100 camera section
120 controller
126 configuration information acquisition section
128 photographed portion determination section
130 measurement section
132 photographing distance calculator
134 photographing range setting section
135 reference information creation section
136 guide screen creation section
150 memory
154 configuration information
154a first configuration information
154b second configuration information
156 camera-section characteristics information
160 display section
165 touch panel
170 communication section
201,202,203,220,221,222,230,231,232 guide screen
300,301,302,310,311,312,320,321,322,323,324 setting screen
400 controller
410 communication section
420 memory
422 design drawing information

What is claimed is:

1. An information acquisition apparatus that displays a photographing guide screen when photographing is performed, the information acquisition apparatus comprising:
a control processor that
acquires configuration information that indicates a configuration of a plurality of portions to be photographed,
determines a photographing state of a portion indicated in the configuration information,
creates the photographing guide screen,
includes the acquired configuration information in the photographing guide screen,
adds, to the portion indicated in the configuration information, state information that indicates a photographing state based on the determination performed by the determination section,
determines whether the portion has been photographed as a photographing state of the portion,
adds, as the state information and to the photographing guide screen, information that indicates whether the portion has been photographed,
measures a size of a portion on the basis of an image of the portion, and adds the measured size of the portion to the photographing guide screen.

2. The information acquisition apparatus according to claim 1, wherein
the plurality of portions to be photographed are construction places.

3. The information acquisition apparatus according to claim 1, wherein
the configuration information is an image of the entirety of the plurality of portions.

4. The information acquisition apparatus according to claim 1, wherein
the configuration information is an image based on a design drawing of the plurality of portions.

5. The information acquisition apparatus according to claim 1, wherein the control processor further calculates, on the basis of characteristics of a camera, a photographing distance for satisfying a requested accuracy with respect to the measurement,
sets a corresponding photographing range on the basis of the calculated photographing distance and the characteristics of the camera, and adds, to the configuration information, information that indicates the set photographing range.

6. An information acquisition apparatus that displays a photographing guide screen when photographing is performed, the information acquisition apparatus comprising:
a control processor that
acquires configuration information that indicates a configuration of a plurality of portions to be photographed, measures a size of a portion on the basis of an image of the portion, calculates, on the basis of characteristics of a camera, a photographing distance for satisfying a requested accuracy with respect to the measurement,
sets a corresponding photographing range on the basis of the calculated photographing distance and the characteristics of the camera,
creates the photographing guide screen,
includes the acquired configuration information in the photographing guide screen, and
adds the set photographing range to the portion indicated in the configuration information.

7. A guide screen display method for displaying a photographing guide screen when photographing is performed, the guide screen display method comprising:
acquiring configuration information that indicates a configuration of a plurality of portions to be photographed;
determining a photographing state of a portion indicated in the configuration information;
creating a photographing guide screen that includes the acquired configuration information and in which state information that indicates a photographing state based on the determination has been added to the portion indicated in the configuration information;
including the acquired configuration information in the photographing guide screen;
adding, to the portion indicated in the configuration information, state information that indicates a photographing state based on the determination performed by the determination section;
determining whether the portion has been photographed as a photographing state of the portion;
adding, as the state information and to the photographing guide screen, information that indicates whether the portion has been photographed;
measuring a size of a portion on the basis of an image of the portion; and
adding the measured size of the portion to the photographing guide screen.

8. A non-transitory computer-readable medium storing a computer program for causing a computer to display a photographing guide screen when photographing is performed, the computer program comprising:
acquiring configuration information that indicates a configuration of a plurality of portions to be photographed;
determining a photographing state of a portion indicated in the configuration information;
creating a photographing guide screen that includes the acquired configuration information and in which state information that indicates a photographing state based on the determination has been added to the portion indicated in the configuration information;
including the acquired configuration information in the photographing guide screen;
adding, to the portion indicated in the configuration information, state information that indicates a photographing state based on the determination performed by the determination section;
determining whether the portion has been photographed as a photographing state of the portion;
adding, as the state information and to the photographing guide screen, information that indicates whether the portion has been photographed;
measuring a size of a portion on the basis of an image of the portion; and
adding the measured size of the portion to the photographing guide screen.

* * * * *